US006909457B1

(12) United States Patent
Fukasawa

(10) Patent No.: US 6,909,457 B1
(45) Date of Patent: Jun. 21, 2005

(54) CAMERA CONTROL SYSTEM THAT CONTROLS A PLURALITY OF LINKED CAMERAS

(75) Inventor: Toshihiko Fukasawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,983

(22) Filed: Sep. 23, 1999

(30) Foreign Application Priority Data

Sep. 30, 1998 (JP) .......................................... 10-278721

(51) Int. Cl.[7] .............................................. H04N 5/232
(52) U.S. Cl. .............................. 348/211.11; 348/211.3; 348/211.6; 348/211.9
(58) Field of Search .................. 348/207.1, 207.11, 348/211.99, 211.3, 211.4, 211.6, 211.9, 211.11, 159, 218.1

(56) References Cited

U.S. PATENT DOCUMENTS

| | | | | | |
|---|---|---|---|---|---|
| 5,164,827 | A | * | 11/1992 | Paff ........................ | 348/211.9 |
| 5,959,667 | A | * | 9/1999 | Maeng ................... | 348/211.99 |
| 6,208,379 | B1 | * | 3/2001 | Oya et al. ................ | 348/211.11 |
| 6,337,709 | B1 | * | 1/2002 | Yamaashi et al. ........... | 348/159 |
| 6,542,191 | B1 | * | 4/2003 | Yonezawa ................... | 348/159 |
| 6,665,006 | B1 | * | 12/2003 | Taguchi ................... | 348/211.1 |

* cited by examiner

Primary Examiner—Wendy R. Garber
Assistant Examiner—Jason Whipkey
(74) Attorney, Agent, or Firm—Fitzpatrick, Cella, Harper & Scinto

(57) ABSTRACT

In order to allow the user to access an arbitrary camera from an arbitrary camera client via a network, and to cause a plurality of cameras to perform a linked movement, a camera linkage server includes a communication path to each camera client, a client control module for controlling a camera used by the camera client, a communication path to each camera server, a camera server control module for controlling the camera used by the camera server, a camera server for controlling each of a plurality of cameras, a camera control module for controlling a camera client having an operation right for the camera and a state of the camera, and a linkage control module, having linked-movement defining information for defining a linked movement between each camera and other cameras, for recognizing a request for connection from an arbitrary camera client to an arbitrary camera via a corresponding client control module, and providing the other camera to perform a linked movement in accordance with the request for the connection with a request for connection via a corresponding camera server control module and a corresponding camera control module, based on the linked-operation defining information.

20 Claims, 21 Drawing Sheets

FIG.5

CS CONTROL TABLE

| $CS_{m-1}$ | ⋮ |
| | ⋮ |
| $CS_m$ | CS-ID (= m) |
| | HOST-COMPUTER NAME |
| | PORT NUMBER |
| | SOCKET NUMBER |
| | CAMERA ID |
| $CS_{m+1}$ | ⋮ |
| | ⋮ |

FIG.6

CC CONTROL TABLE

| $CC_{k-1}$ | ⋮ |
| | ⋮ |
| $CC_k$ | CC-ID (= k) |
| | SOCKET NUMBER |
| | CAMERA ID |
| $CC_{k+1}$ | ⋮ |
| | ⋮ |

FIG.7

CAMERA-STATE CONTROL TABLE

| CAMERA n-1 | ... | ... |
|---|---|---|
| CAMERA n | ID (= n) OF CAMERA n | |
| | CS-ID OF CAMERA CONTROL MODULE FOR CONTROLLING CAMERA n | |
| | CC-ID OF CLIENT UTILIZING CAMERA n | |
| | CC-ID OF CLIENT HAVING OPERATION RIGHT FOR CAMERA n | |
| | TYPE OF CAMERA n | |
| | CAPTION (COMMENT AND LIKE RELATING TO CAMERA n) | |
| | ORIENTATION OF CAMERA n (IN VERTICAL AND HORIZONTAL DIRECTIONS) | |
| | ZOOMING MAGNIFICATION OF CAMERA n | |
| CAMERA n+1 | ... | ... |

FIG.8

CAMERA-LINKAGE-INFORMATION CONTROL TABLE

| CAMERA ID | ACTION NAME Action-Name | STARTING CONDITIONS | TARGET CAMERA TO BE LINKED Target | PROCESSING TO BE PERFORMED DURING CONFLICT Policy | OPERATION CONTENTS | ALTERNATIVE-CAMERA FLAG | ALTERNATIVE CAMERA Alternative |
|---|---|---|---|---|---|---|---|
| CAMERA I | IMAGE SWITCHING #1 | Pan = pp1 | CAMERA II | WAIT FOR A FEW SECONDS | nPan = pp3 | | |
| | | Tilt = tt1 | | | nTilt = tt3 | | |
| | | Zoom = zz1 | | | nZoom = zz3 | | |
| | IMAGE SWITCHING #2 | Pan = pp2 | | | nPan = pp4 | | |
| | | Tilt = tt2 | | | nTilt = tt4 | | |
| | | Zoom = zz2 | | | nZoom = zz4 | | |
| | ⋯ | ⋯ | ⋯ | ⋯ | ⋯ | ⋯ | |
| CAMERA II | | | | | | | |

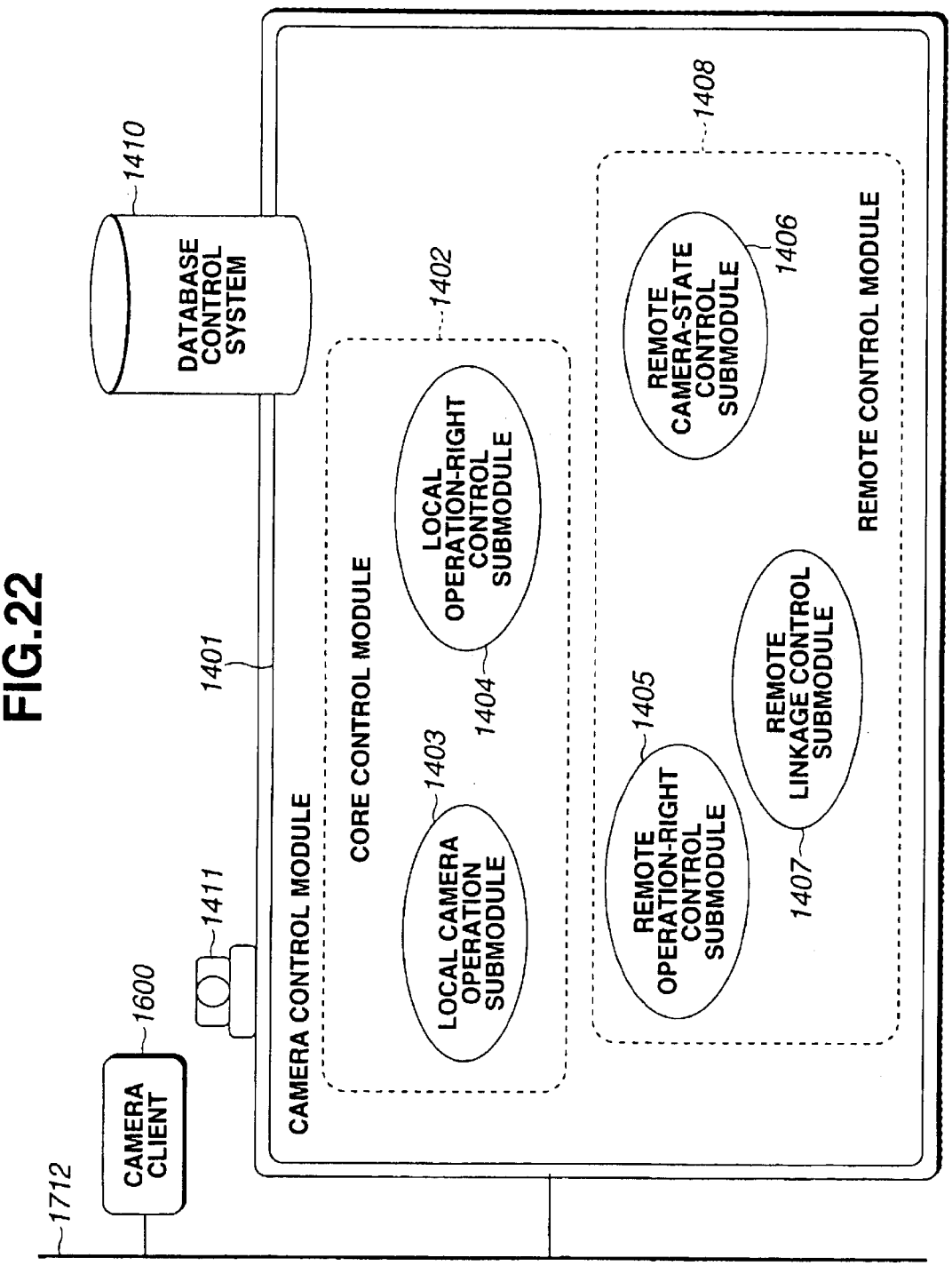

CAMERA CONTROL SYSTEM THAT CONTROLS A PLURALITY OF LINKED CAMERAS

BACKGROUND OF THE INVENTION

1. Field of the Invention

The present invention relates to a camera control system, a camera control method, a camera control server, a camera apparatus, a user interface apparatus, and the like for distributing an image via a computer network, such as the Internet, an Intranet or the like. More particularly, the invention relates to an improvement in a operation of a video camera installed at a remote location in image distribution service.

2. Description of the Related Art

Recently, in accordance with the spread of computer networks, such as the Internet, Intranets and the like, "remote apparatus service systems" which allow the user to operate a peripheral apparatus, such as a printer, a scanner or the like, installed at a remote location via a computer network have been produced more and more.

A "remote camera system" is one such system. In a remote camera system, an image from a video camera installed at a remote location can be seen at any location in the world via a computer network. In such a remote camera system not only can an image from a camera be seen, but also the orientation or the zooming magnification of the camera can be operated from a remote location.

FIG. 1 is a diagram illustrating the concept of a conventional remote camera system. As can been understood from FIG. 1, the system includes the following four types of components.

Video cameras 201, 202 and 203 for sensing images

A camera control module 204 which allows the user to operate the video cameras 201–203 from a remote location.

Camera clients 205, 206 and 207 which provide the user with a user interface for seeing a camera image or operating the camera.

A computer network 208 which connects the camera clients 205–207 to the camera control module 204.

The main function of the remote camera system is provided by the camera control module 204. In FIG. 1, the camera control module 204 can be realized by means of any hardware. Usually, however, the camera control module 204 is mounted as software in an ordinary personal computer (hereinafter abbreviated as a "PC"). In such step, the video camera is connected to the PC by a communication means such as RS232C or the like. In a conventional approach, the camera control module 204 is integrated with the video camera.

In any of the conventional approaches, the camera control module 204 requires an interpretation/execution unit for interpreting/executing a "camera-operation request" transmitted from a camera client, and a camera-operation-right arbitration unit for determining, when a plurality of camera clients simultaneously request to operate the same camera, to which camera client the operation right for the camera is to be provided.

In ordinary conventional remote camera systems, a single camera control module usually operates a single camera. There exist conventional systems in which a single camera control module controls a plurality of cameras. Even in such systems, however, only a single camera can be actually be operated, and it is impossible to operate other cameras simultaneously.

It is possible to apparently operate a plurality of cameras by providing a plurality of camera control modules. In this case, however, each camera is independently operated by a dedicated module. Accordingly, it is difficult to cause a plurality of cameras to operate in cooperation with one another, or to be linked with one another compensating for problems in other cameras.

SUMMARY OF THE INVENTION

It is an object of the present invention to provide a camera control system, a camera control method, a camera control server, a camera apparatus and a user interface apparatus which can cause a plurality of cameras or camera servers to perform a linked or cooperative operation.

It is another object of the present invention to provide a linkage control server for causing a plurality of camera servers to perform linked or cooperative operation based on a plurality of camera clients.

According to one aspect of the present invention, a camera control system for controlling a linked operation of a plurality of cameras via a network includes camera setting means for setting a plurality of cameras connected to the network as cameras to be linked with one another, operation setting means for setting conditions and contents of a linked operation for each of the cameras set by the camera setting means, camera-state-information acquisition means for acquiring information relating to the state of at least one photographing parameter (such as panning, tilting and zooming) of the plurality of cameras set by the camera setting means, starting means for staring, when a camera satisfying the conditions of the linked operation set by the operation setting means is present based on the state information acquired by the camera-state-information acquisition means, the contents of the linked operation corresponding to the conditions of the linked operation set by the operation setting means, and output means for outputting a control command corresponding to the contents of the linked operation to at least one camera to be linked with the camera satisfying the set conditions.

According to another aspect of the present invention, a camera control method for controlling a linked operation of a plurality of cameras via a network includes a camera setting step of setting a plurality of cameras connected to the network as cameras to be linked with one another, an operation setting step of setting conditions and contents of a linked operation for each of the cameras set in the camera setting step, a camera-state-information acquiring step of acquiring information relating to the state of at least one photographing parameter of the plurality of cameras set in the camera setting step, a starting step of starting, when a camera satisfying the conditions of the linked operation set in the operation setting step is present based on the state information acquired in the camera-state-information acquiring step, the contents of the linked operation corresponding to the conditions of the linked operation set in the operation setting step and an output step of outputting a control command corresponding to the contents of the linked operation to at least one camera to be linked with the camera satisfying the set conditions.

According to still another aspect of the present invention, a storage medium stores an operation processing program for controlling a linked operation of a plurality of cameras via a network. The program includes the processes of setting a plurality of cameras connected to the network as cameras to be linked with one another, setting conditions and contents of a linked operation for each of the set cameras, acquiring information relating to the state of at least one photographing parameter of the plurality of set cameras, starting, when a camera satisfying the set conditions of the linked operation is present based on the acquired state information, the contents of the linked operation corresponding to the set conditions of the linked operation, and outputting a control command corresponding to the contents of the linked operation to at least one camera to be linked with the camera satisfying the set conditions.

The foregoing and other objects, advantages and features of the present invention will become more apparent from the following description of the preferred embodiments taken in conjunction with the accompanying drawings.

BRIEF DESCRIPTION OF THE DRAWINGS

FIG. 5 is a diagram illustrating the configuration of a CS (camera service) control table used in the first embodiment;

FIG. 6 is a diagram illustrating the configuration of a CC (camera client) control table used in the first embodiment;

FIG. 7 is a diagram illustrating the configuration of a camera-state control table used in the first embodiment;

FIG. 8 is a diagram illustrating the configuration of a camera-linkage-information control table used in the first embodiment;

FIG. 22 is a block diagram illustrating the configuration of the second embodiment.

DESCRIPTION OF THE PREFERRED EMBODIMENTS

The preferred embodiments of the present invention will now be described with reference to the drawings.

First Embodiment

Figure 1:
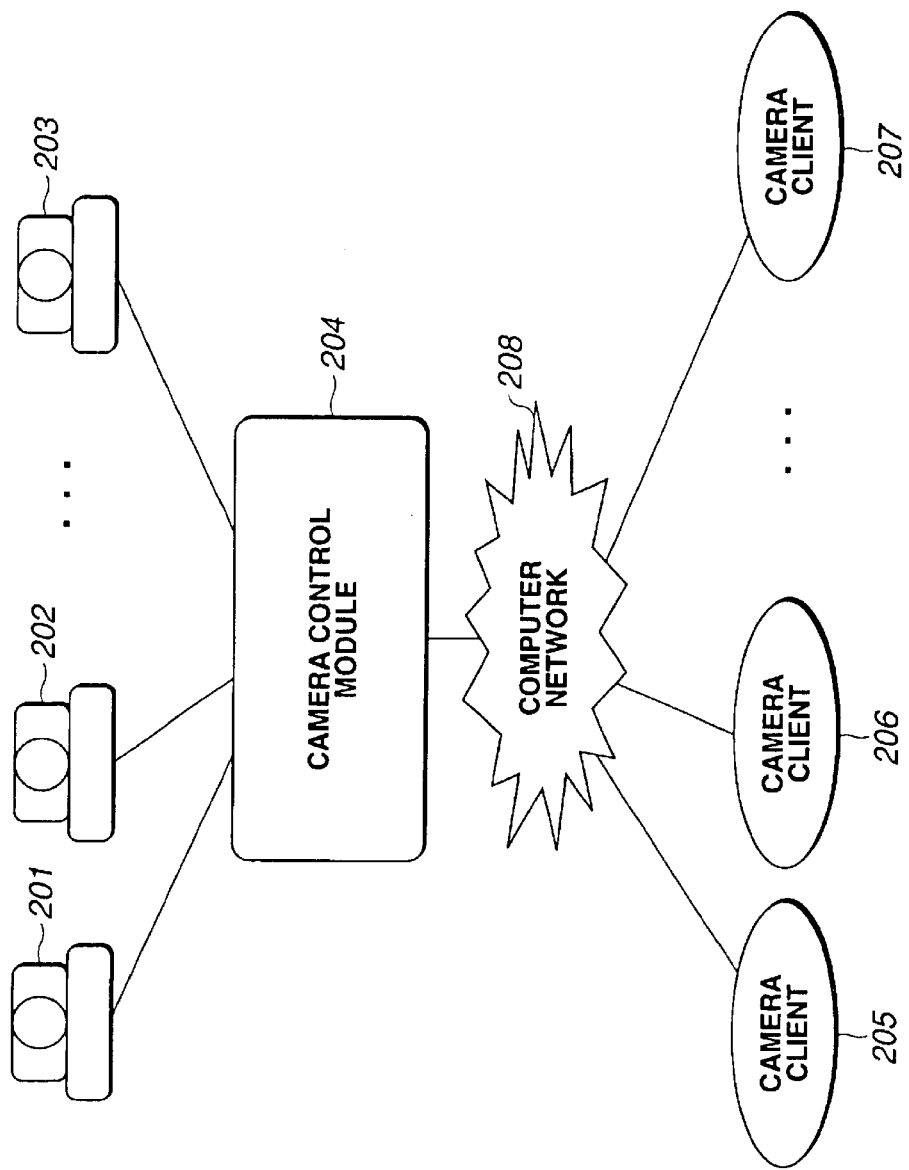
FIG. 1 is a block diagram illustrating the configuration of a conventional remote camera system.

In a first embodiment of the present invention, the conventional remote camera system shown in FIG. 1 is improved, and software titled a "camera linkage control server" is introduced in addition to the camera control module.

Figure 2:
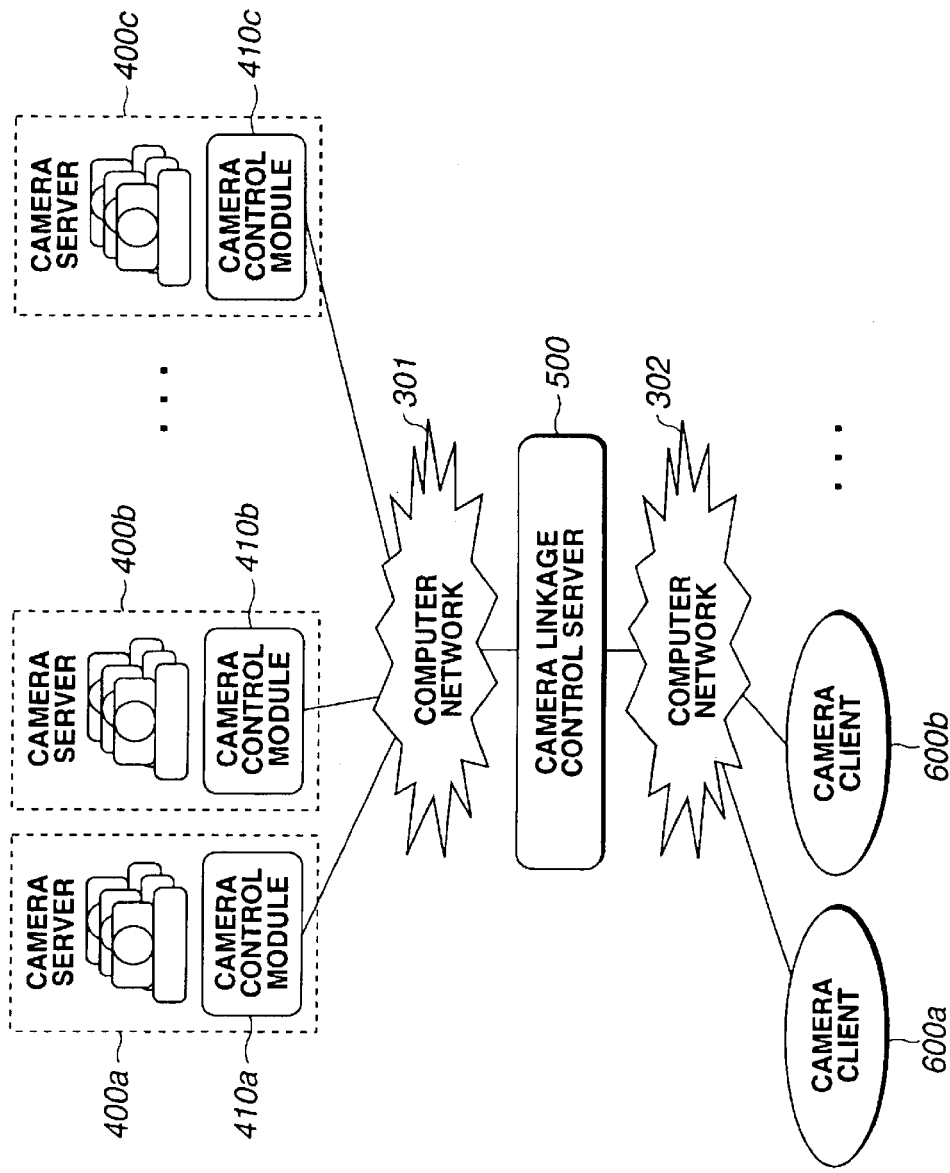
FIG. 2 is a block diagram illustrating the configuration of a network according to a first embodiment of the present invention.

FIG. 2 is a block diagram illustrating an outline of the configuration of a remote camera system according to the first embodiment.

In FIG. 2, the remote camera system includes a plurality of camera servers 400a, 400b and 400c having corresponding camera control modules 410a, 410b and 410c, a plurality of camera clients 600a and 600b, a computer network 301 to which the camera control modules 410a, 410b and 410c are connected; a computer network 302 to which the camera clients 600a and 600b are connected, and a camera linkage control server 500 provided between the networks 301 and 302.

The camera client is a user who intents to utilize a remote camera via the networks. Actually, the user is, for example, a personal computer system, a work station system or a main-frame computer system which can operate a predetermined client application program. Each of the camera control modules 410a, 410b and 410c is separately installed in the corresponding camera server.

The camera linkage control server 500 is started by an appropriate PC or the like provided between the camera clients and the camera control modules of the respective camera servers, and performs communication with an appropriate pair of the camera clients and the camera servers via the computer networks 301 and 302.

Figure 3:
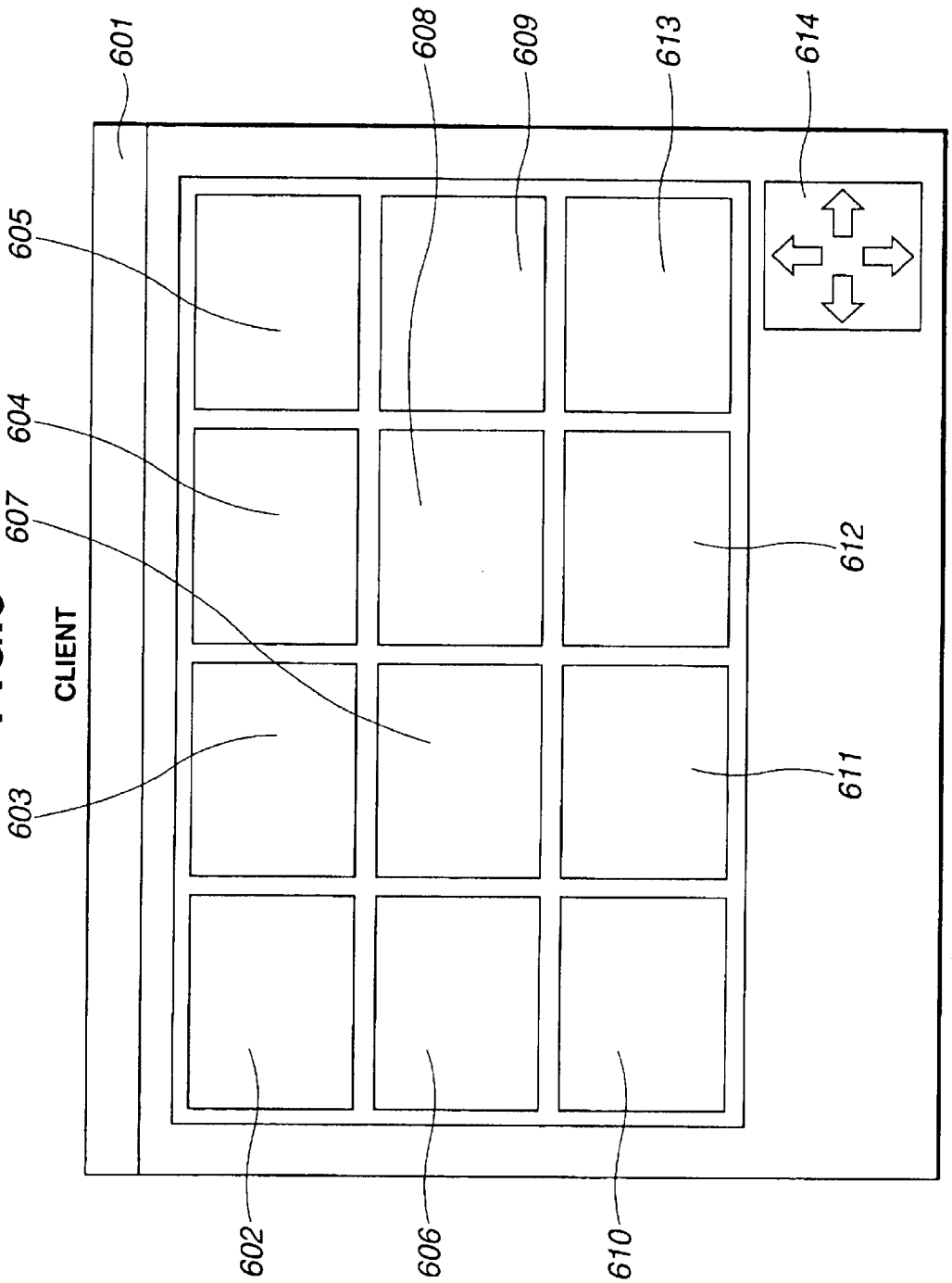
FIG. 3 is a diagram illustrating a user interface for a client in the first embodiment.

In order to be able to utilize a plurality of cameras via the camera linkage control server 500, it is preferable that each of the camera clients on the computer network 302 provides a user interface such as that shown in FIG. 3.

The user interface shown in FIG. 3 has windows for displaying images 602–613 from a plurality of cameras on an image window 601. By selecting a desired image window using a mouse or the like, the user of the camera client selects a target scene, i.e., a target camera. That is, the user is allowed to assign a camera to be subjected to linked control based on an image currently sensed by the camera. The image sensing direction of the selected camera is assigned using a camera controller icon 614. When intending to assign an image sensing direction, a corresponding arrow on the camera controller icon 614 displayed at a lower portion of the window 601 is selected using the mouse or the like.

A request for a camera operation (assignment of a camera to be linked, and assignment of an image sensing direction) is transmitted to the camera control module of the assigned camera server via the camera linkage control server 500, and the orientation of the camera is changed.

The camera controller icon 614 shown in FIG. 3 can assign only a change in the image sensing direction of the camera. Actually, however, if any other operation (such as assignment of the zooming magnification or the like) is required for the camera, a corresponding appropriate button or the like may be added to the user interface.

As a result of camera linkage processing by the camera linkage control server 500 in the first embodiment, when the user operates a certain camera (for example, a camera sensing an image 603), a camera assigned to be linked with that camera is subjected to a predetermined operation by the control server 500 without the user's operation. For example, the photographing direction of the camera sensing an image 605 is changed.

The Configuration of the Camera Linkage Control Server

Figure 4:
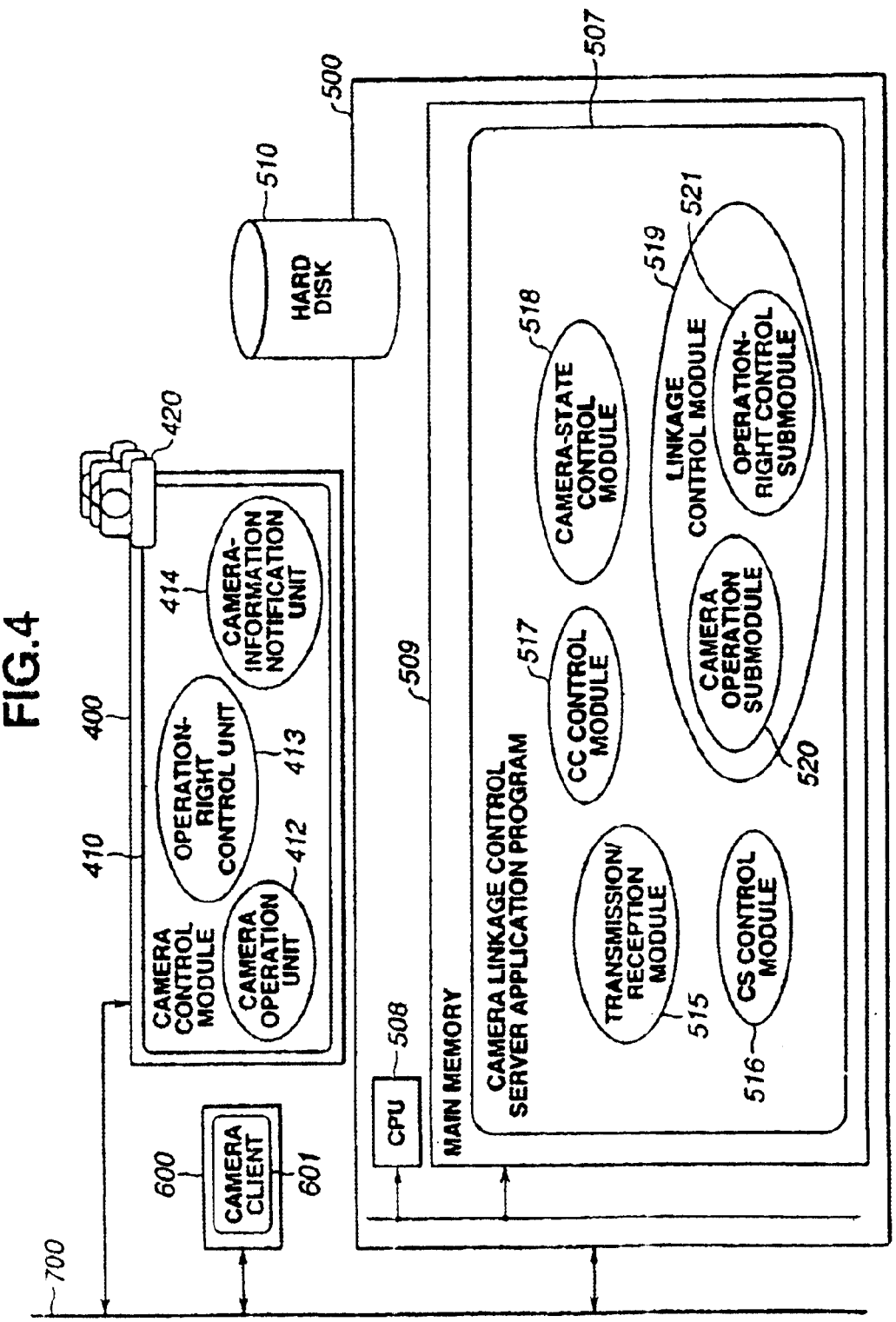
FIG. 4 is a block diagram illustrating the concept of the first embodiment.

The configurations of the camera linkage control server 500, the camera server 400 and the camera client 600 shown in FIG. 2 will now be described with reference to FIG. 4. In FIG. 4, for the convenience of illustration, it is assumed that one camera client 600 and one camera server 400 are connected to a network 700.

The camera linkage control server 500 includes a CPU (central processing unit) 508, a main memory 509, and a hard disk 510. Each software component is loaded from the hard disk 510 into the main memory 509, and is executed by the CPU 508. The camera server 400 and the camera client 600 each also include a CPU, a main memory, a hard disk, and the like. A video camera 420 for sensing images is provided in the camera server 400.

As described above, the camera client 600 includes a display and an input/output device, such as a mouse or the like, for the user's operation of the camera client 600, and has the function of transmitting a request for a camera operation to a camera control module 410. This request is transmitted to the camera server 400, and the user of the camera client 600 can operate the video camera 420.

The camera control module 410 of the camera server 400 includes a camera operation unit 412 for controlling the camera 420, and an operation-right control unit 413 for adjusting the operation right for the camera 420. The camera operation unit 412 is realized by a mechanism for converting a request for a camera operation from a camera client or the like into a driving signal for a motor incorporated in the camera 420.

The operation-right control unit 413 provides one of a plurality of camera clients which have requested a camera operation with an operation right. In order to realize the operation-right control unit 413, for example, processing of providing a client which has first requested a camera operation with an operation right, and then providing a client which has next requested a camera operation with an operation right is used. Only a request for a camera operation transmitted from a client provided with an operation right may be transmitted to the camera operation unit 412.

The camera control module 410 also includes a camera-information notification unit 414 for notifying the camera client 600 or the camera linkage control server 500 of the states (the orientation and the like) of the camera, and the status of acquisition of an operation right.

As the camera linkage control server 500, each of the camera control module 410 and the camera client 600 includes a transmission/reception module. These transmission/reception modules serve as communication means between appropriate ones of the camera control module 410 of the camera server 400, the camera control module 601 of the camera client 600, and a camera-linkage control server application program 507 of the camera linkage control server 500. The transmission/reception module comprises an ordinary interprocess communication mechanism, such as a socket or the like. The camera-information notification unit 414 of the camera server 400 is realized by transmitting camera-state information to another software at an appropriate timing utilizing such a transmission/reception module.

A software module constituting the camera linkage control server application program 507 will now be described. The term "software module" indicates an internal functional unit of software. Usually, a software module is provided in the form of a group of functions, a class or an object in an object-oriented architecture, or the like. The camera control module 410 may be realized as a software module if appropriately mounted. Accordingly, unless particularly mentioned, the word "module" hereinafter indicates a "software module". As shown in FIG. 4, the camera linkage control server application program 507 includes the following modules:

a transmission/reception module 515,
a CS control module 516,
a CC control module 517,
a camera-state control module 518,
a camera linkage control module 519,
a camera operation submodule 520, and
an operation-right control submodule 521.

Transmission/Reception Module 515

In the following description, it is assumed that the transmission/reception module 515 is a mounted socket. The trasmission-reception module 515 has the function of receiving requests and replies transmitted from the camera control module 410 and the client control module 601. The received message is converted into the format of an internal message, and is transferred to other modules. Usually, this message format for internal exchange can be mounted as a message of an object-oriented language, such as C++ or the like. When utilizing a language which is not object-oriented, this message format can also be mounted as ordinary function calling.

The transmission/reception module 515 also provides the function of transmitting requests or replies to another software. An internal message transmitted from another module is converted into a message format which can be dealt with in an interprocess communication mechanism.

CS (Camera Server) Control Module 516

The CS control module 516 controls information relating to the camera control module. The CS information includes items, such as a "CS-ID", a "host-computer name", a "port number", a "socket number", a "camera ID", and the like.

The "CS-ID" is a unique ID provided in advance for identifying each camera control module. In the first embodiment, the CS-ID is mounted as an integer equal to or larger than 1. The CS-ID can be used as a key when the application program 507 retrieves CS information. The "host-computer name" is the "name" of the computer where the camera control module is operating. The "port number" is a number provided for a port for interprocess communication provided by the camera control module 410. By assigning the "host-computer name" and the "port number", the application program 507 can perform communication with the camera control module 410.

The "socket number" is a number indicating a communication channel, i.e., a "socket", formed with respect to the camera control module 410 by the "host-computer name" and the "port number". By transmitting the "socket number" to the transmission/reception module 515, the application program 507 can assign a party where a message is to be transmitted, i.e., a camera control module 410. The "camera ID" is a unique identifier ID allocated to the camera which is under the control of the camera control module 410. The "camera ID" is also mounted as an integer equal to or larger than 1. There is the possibility that the camera control module controls a plurality of cameras. In such a case, the list of "camera IDs" is added to CS information. At that time, the order of arrangement of the "camera IDs" corresponds to camera identifiers at the camera control module (hereinafter particularly termed "local camera IDs"). When discriminating camera IDs from "local camera IDs", the camera IDs are termed "global camera IDs".

The first camera ID in the list of "camera IDs" is dealt with as the local "camera ID" no. 1 at the camera control module. For example, in FIG. 4, three cameras are under the control of the camera control module 410. It is assumed that the "local camera IDs" of the cameras are "1", "2" and "3" from the front side. If it is assumed that the "global camera IDs" of these cameras are 102, 501 and 405, the numbers 102, 501 and 405 are arranged in this sequence in the "camera ID" item within the CS information.

The CS control module 516 controls the CS information in the form of an ordinary table as shown in FIG. 5. This table is termed a "CS control table". When mounting this table, data can be provided as permanent data using a hard disk or a database system. If it is not desired to provide a permanent data, the table may be formed in a memory. In such a case, however, information within the CS control module is lost upon completion of the linkage control server. Accordingly, it is necessary to provide CS information using a starting option or an initialization file at the next starting.

CC (Camera Client) Control Module 517

The CC control module 517 controls CC information of a camera client. As shown in FIG. 6, the CC information includes items, such as a "CC-ID", a "socket number", a "camera ID", and the like.

The "CC-ID" is a unique identifier allocated to each camera client by the CC control module 517. In the first embodiment, the CC-ID is mounted as an integer equal to or larger than 1. The "CC-ID" is allocated by the CC control module when a request for connection is transmitted from a camera client to the camera-linkage control server application program 507. As the "CS-ID", the "CC-ID" can be used as a key for acquiring CC information.

The "socket number" shown in FIG. 6 indicates the number of a socket represented by the transmission/reception module 515 for communication with a camera client identified by the "CC-ID". The "camera ID" is the "camera ID" of the camera currently being used by the client.

The CC control module can also be mounted in the form of a table similar to that used for the CS control module (a CC control table). In the CC control module 517, however, since it is unnecessary to provide in advance CC information, initialization processing as in the case of the CS control module is unnecessary.

Camera-State Control Module 518

The camera-state control module 518 of the application program 507 controls information relating to each camera, i.e., camera-state information. Camera-state information controlled in the camera-state information module 518 is shown in FIG. 7. In FIG. 7, information relating to the camera having a camera ID n is mainly shown.

A camera-state control table controls states relating to a plurality of cameras. Information relating to the state of a specific camera is retrieved by using the "camera ID" as a key. The linkage control server 500 acquires the latest camera-state information by asking the camera control module of the camera server controlling camera n. When the state (the image sensing direction or the operation right) of the camera has been changed by the camera control module, the camera-information notification unit 414 within the camera control module 410 notifies the linkage control server 500 of the change. The camera-state information can be updated at aby time based on this notification. The camera-state control table may be mounted in the form of a table similar to that for the CS control module, as shown in FIG. 7.

Linkage Control Module 519

The linkage control module 519 of the camera linkage control server 500 controls a linkage movement among a plurality of cameras. The linkage control module 519 controls a camera-linkage information table which describes how linkage is to be controlled (see FIG. 8), and executes linkage processing based on the contents of the table. As shown in FIG. 4, the linkage control module 519 includes two submodules, i.e., the camera operation submodule 520 and the operation-right control submodule 521.

The camera operation submodule 520 interprets/executes camera linkage information, and instructs a camera operation to the camera control module 410. The operation-right control submodule 521 executes processing of acquiring all the operation rights of cameras to be linked with a camera assigned signed by a client.

In the first embodiment, a plurality of camera clients can request a camera operation by the same camera. Accordingly, when executing linkage processing, a case may arise in which a camera to be linked is already in use by another client, and therefore the operation right can not be acquired. When conflict in the operation right occurs in the above-described manner, the operation-right control submodule 521 executes processing to resolve the conflict based on the description within the camera-linkage-information control table. The processing of arbitrating conflict provided in the first embodiment includes the following action items. That is, when a request for a camera p which is already being used is provided, wait until the operation right is released, forcedly acquire an operation right for the camera p, acquire an operation right for an alternative camera (for example, a camera q), and give up an operation for the camera p.

Figure 9:
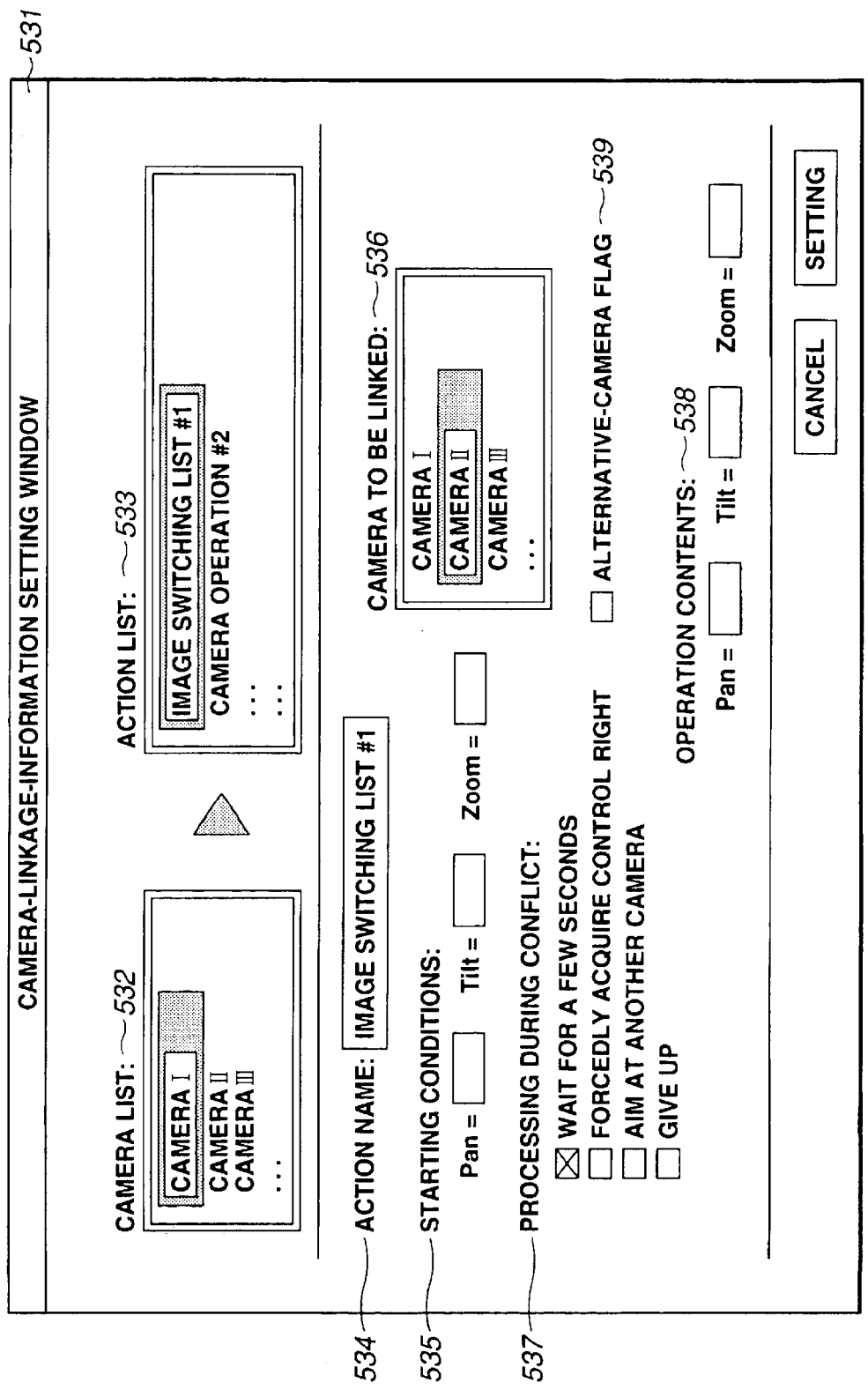
FIG. 9 is a diagram illustrating a user interface for forming camera linkage information.

The camera-linkage-information control table (FIG. 8) used by the linkage control module 519 can be formed using a user interface provided by the linkage control module 519, as shown in FIG. 9. Items which can be set on a window 531 (see FIG. 9) in the first embodiment are as follows:

a camera list 532, an action list 533, an action name 534, starting conditions 535, cameras to be linked 536, processing during conflict 537, operation contents 538, and an alternative-camera flag 539.

That is, each item input via the window shown in FIG. 9 is stored in a corresponding storage region of the camera-linkage-information control table shown in FIG. 8.

The "camera IDs" of all cameras controlled by the camera-state control module 518 are stored in a "camera list" storage region of the camera-linkage-information control table shown in FIG. 8. The list of "camera IDs" within the "camera list" of the camera-linkage-information control table is displayed on the display region "camera list" 532 shown in FIG. 9. In the case of FIG. 9, "camera I", "camera II" and "camera III" are displayed.

The list of "linkage operations" set for the camera selected by the user ("camera I" in the case of FIG. 9) from the camera list displayed on the region 532 is displayed on the display region "action list" 533. The "linkage-movement", i.e., action, set for each camera is stored in the "action list" in the camera-linkage-information control table. The "action list" in the camera-linkage-information control table is generated when a linkage operation is newly set. That is, when newly setting a "linkage movement", i.e., an action, first, a target "camera ID" is selected on the "camera list" display region 532, and then the "action name" and the "starting conditions" to be set for the target camera are set in the regions 534 and 535, respectively. The "action name" is arbitrarily provided for the linkage information by the user. In the case of FIG. 9, a name "image switching" is provided. The "action name" is also displayed on the action list 533. An arbitrary character string may be assigned for the value of the action name.

The region 535 for inputting the "starting conditions" sets conditions for starting the linkage processing. In the first embodiment, a Pan angle in the horizontal direction making the forward direction of the camera selected from the camera list 0 degree, a Tilt angle in the vertical direction making the horizontal direction of tilting 0 degree, and a zooming magnification Zoom are assigned. The assigned values are stored in regions for the corresponding "actions" of the concerned "camera ID". In the case of FIG. 8, the "starting conditions" set in the action name "image switching" set for the camera I are:

Pan=pp1 degrees,

Tilt=tt1 degrees, and

Zoom=zz1.

When the actual image sensing direction, zooming magnification and the like of the camera I coincide with the values stored in the "starting conditions" of the camera-linkage-information control table, linkage processing is executed.

In FIG. 9, the input display region 536 for the "camera to be linked" is used for selecting a camera to be linked. The identifier of the linked camera assigned in the region 536 is stored in the corresponding region of the camera-linkage-information control table. It is possible to select a plurality of cameras as "cameras to be linked".

A check box 539 is used for indicating whether or not an alternative camera is to be used when a request to use a camera conflicts. This alternative camera is used when "acquire an operation right for another camera" is selected as processing during conflict. That is, when "acquire an operation right for another camera" has been selected as processing durint conflict, and a flag for this alternative camera is made in an on-state, the camera displayed in the region 536 is used as the alternative camera at processing during conflict.

The "operation contents" input region 538 is used for setting the orientation and the zooming magnification of the camera to be linked after linkage processing. The "processing during conflict" input region 537 is used for assigning processing during conflict of the operation right. When "acquire an operation right for another camera" has been selected as the "processing during conflict", the "camera ID" of the alternative camera to be used when acquisition of the operation right fails must also be selected.

The camera linkage information formed on the user interface shown in FIG. 9 is stored in a main memory or a secondary storage device as text data including the following items, as shown in FIG. 8. In the following description, each line starting with // is a note.

// Starting conditions

Action-Name=the action name,

Camera-Id=the ID of the camera defining the starting conditions,

Pan the panning angle as the starting condition,

Tilt=the tilting angle as the starting condition,

Zoom=the zooming magnification as the starting condition,

// Setting of linkage processing

Target=the ID of the camera to be linked,

Type=the type of the camera,

Policy=the number of the item selected at processing during conflict,

Alternative=the ID of the alternative camera, nPan=the panning angle in the operation contents, nTilt=the tilting angle in the operation contents, nZoom=the zooming magnification in the operation contents.

If the camera assigned as "Target" is an ordinary camera to be linked, a character string "target" is set as the value for the "Type" item. If the camera is assigned as an alternative camera, a character string "alternative" is set as the value for the "Type" item. The value for the item "Policy" is a number counted from the uppermost item for the item selected as processing for resolving conflict shown in FIG. 9. Accordingly, an integer from 1 to 4 is provided as the value. An alternative camera as the value of the item "Alternative" is referred to only when the value of the item "Policy" equals "3". The value "3" for the item "Policy" is set when "acquire an operation right for another camera" has been selected.

In the first embodiment, the user interface is designed assuming that only panning, tilting and zooming of the camera can be set. However, any other controllable setting item may be set depending on the type of the camera. Since linkage information in the first embodiment is controlled in the form of a text, an item may be directly set using a text editor or the like without using the GUI (graphic user interface) shown in FIG. 9.

Although in the first embodiment, the values for panning, tilting and zooming must be directly input as numerial values, these values may be set while actually seeing an image displayed on the camera client. In order to realize this approach, the user may be asked to operate the camera using an appropriate camera client, and when the orientation and the zooming magnification of the camera to be set have been determined, camera-state information at that time may be acquired from the camera-state control module.

Outline of the Operation

Next, an outline of the operation in the first embodiment will be described. The first embodiment has the following operational phases:

1. Starting of a linkage control server

2. Starting of a camera client

3. A camera operation by the camera client
   3-1. The camera operation
   3-1. Notification of the camera operation 4. A linked movement of a camera
   4-1. Control of the camera operation right for the camera
   4-1. A camera operation Each of the above-described phases will be described with respect to FIGS. 10 through 19.

In the following description, it is assumed that all the power supplies of cameras to be subjected to linkage control are turned on. It is also assumed that the camera control module for controlling each camera normally operates.

Starting of the Linkage Control Server

Figure 10:
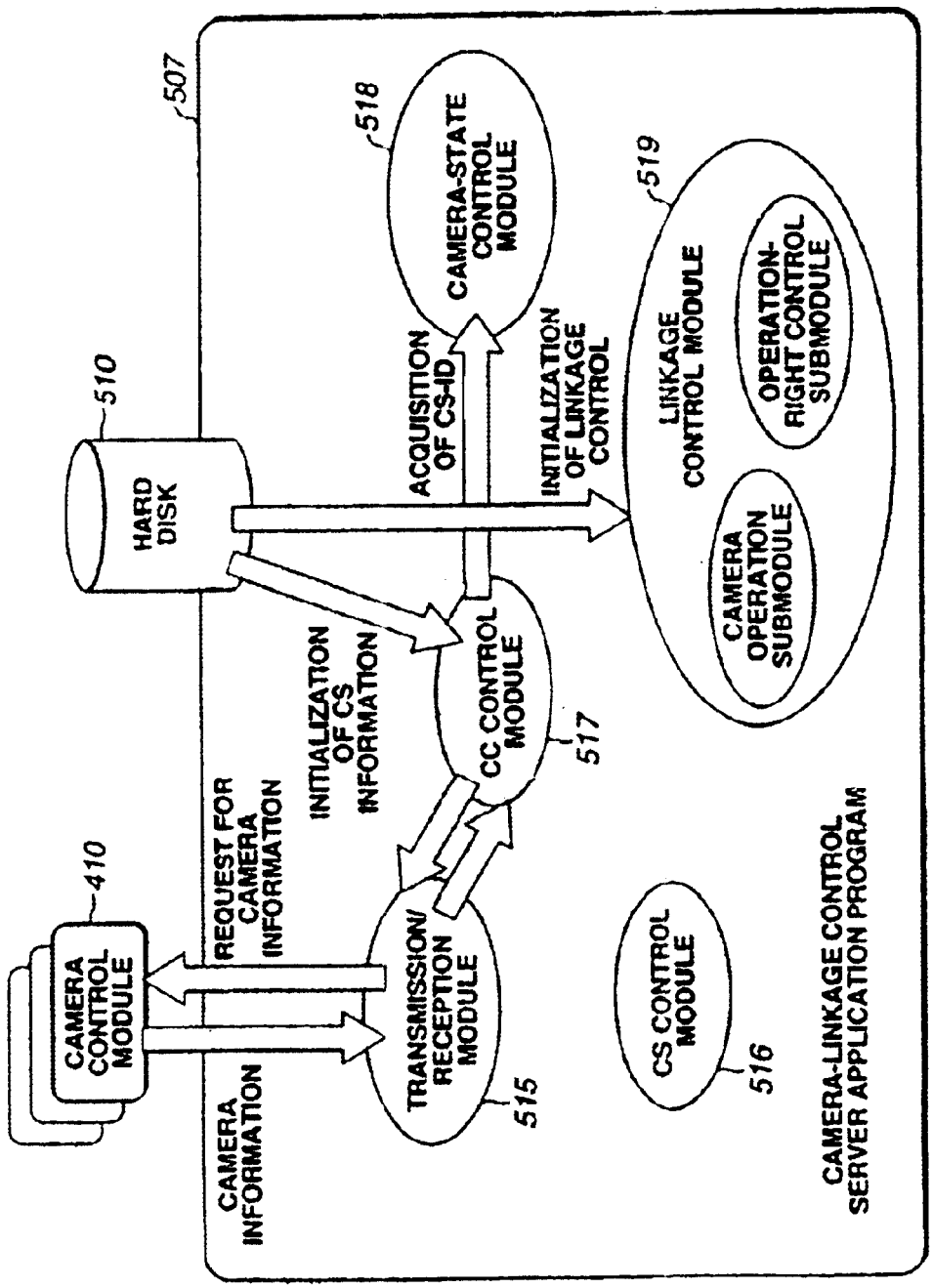
FIG. 10 is a block diagram illustrating processing for staring a linkage control server.
Figure 11:
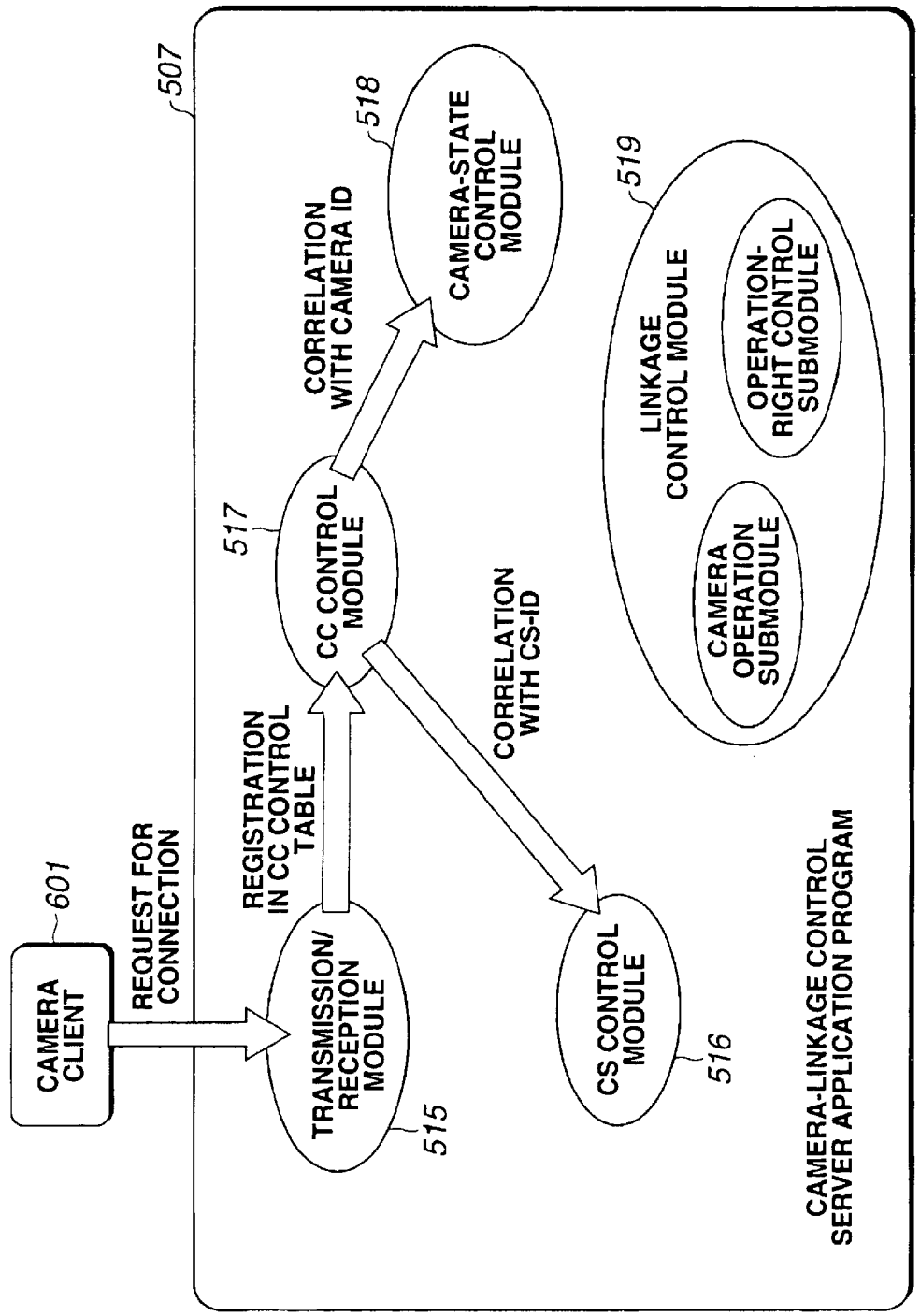
FIG. 11 is a block diagram illustrating processing for starting a camera client.
Figure 12:
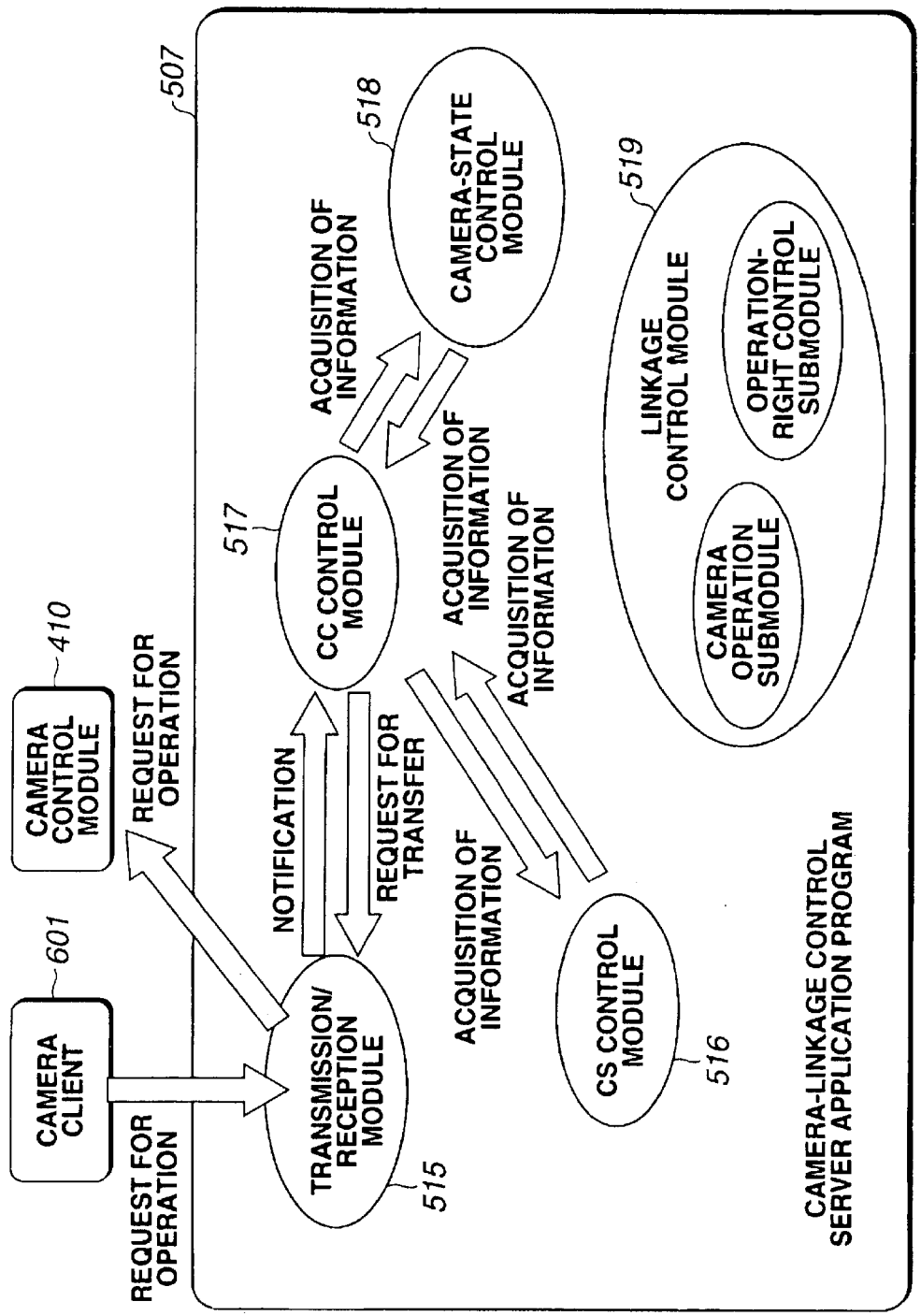
FIG. 12 is a block diagram illustrating processing for a camera operation by a camera client.
Figure 15:
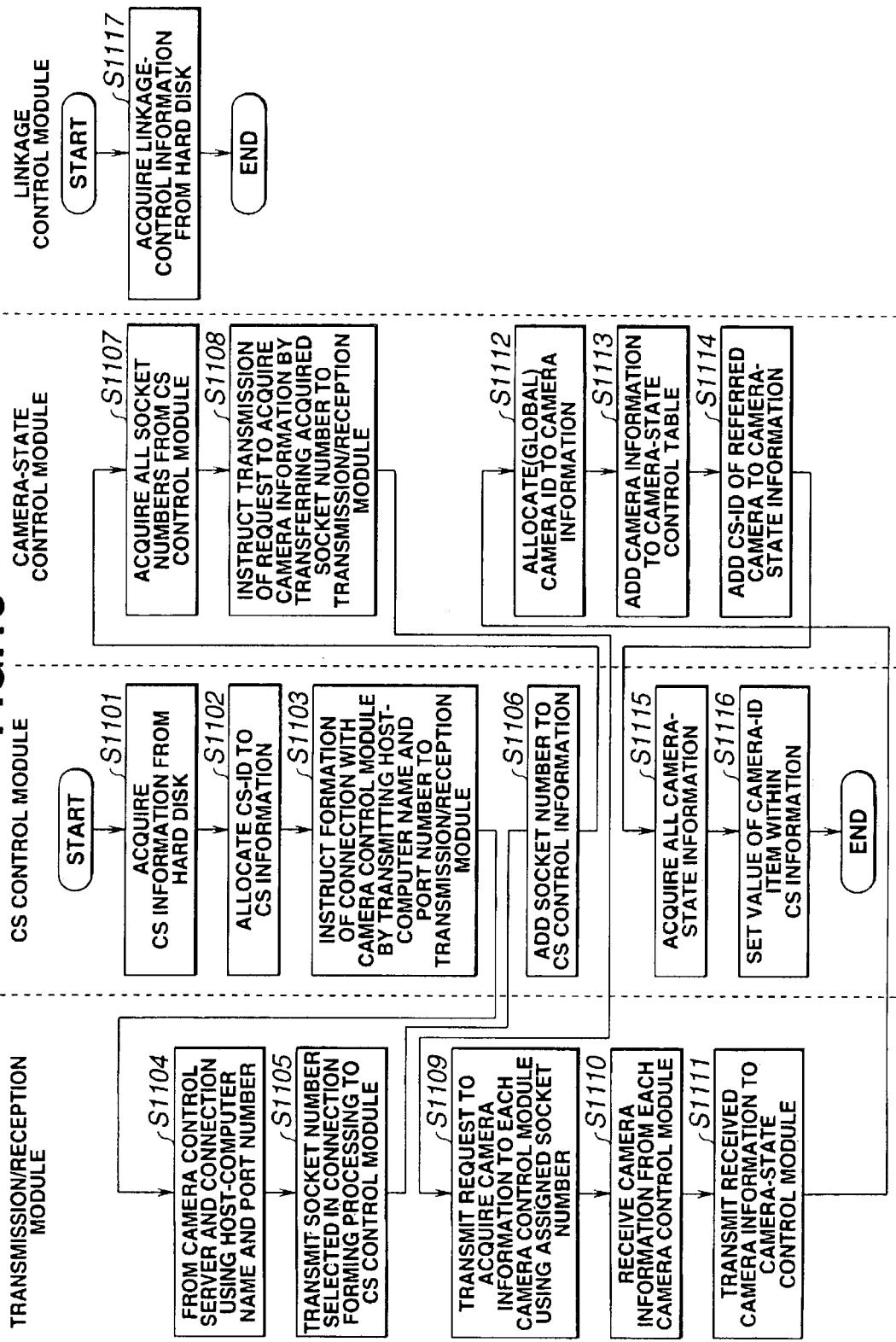
FIG. 15 is a flowchart illustrating processing for starting a linkage control server.
Figure 16:
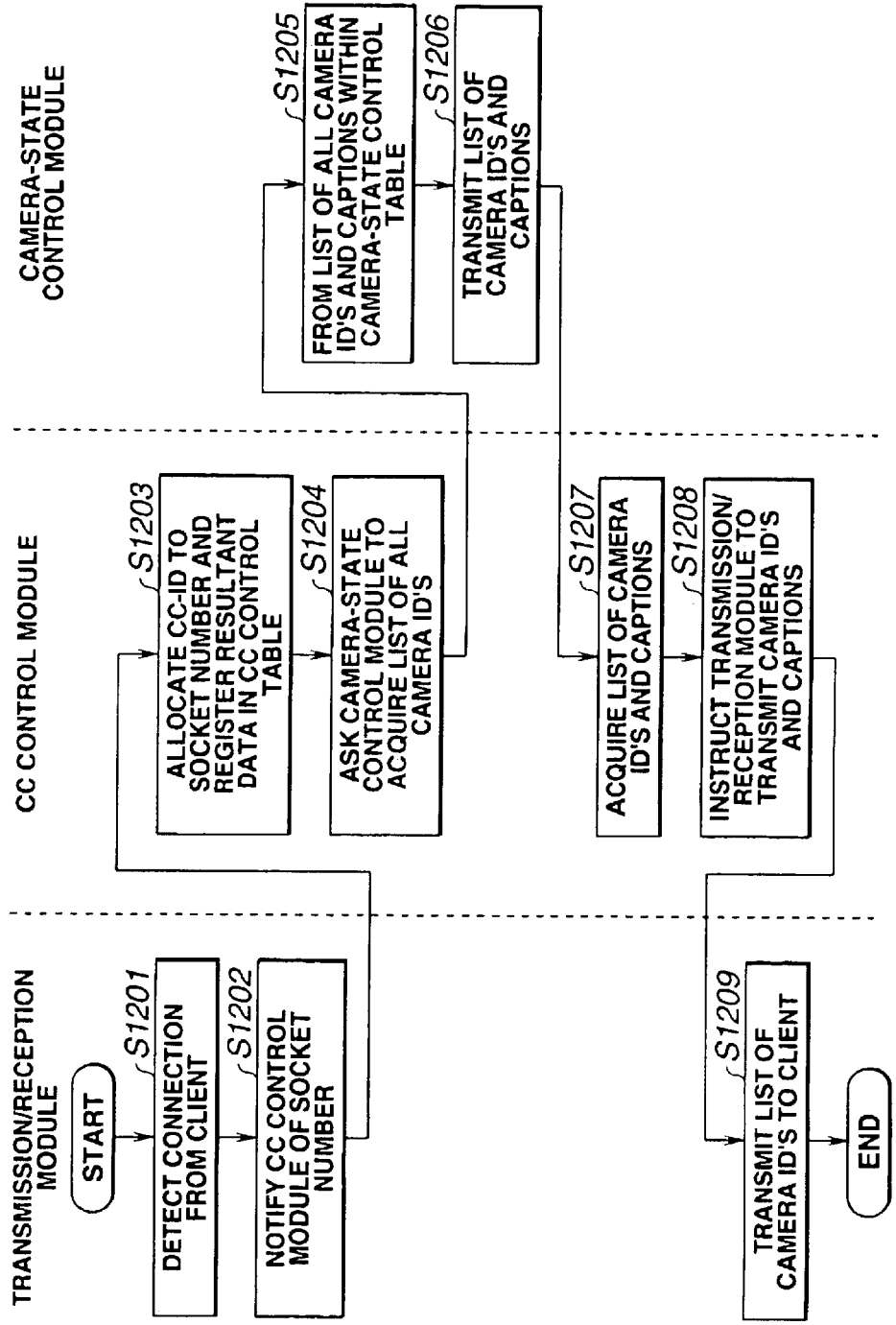
FIG. 16 is a flowchart illustrating processing for starting a camera client.
Figure 17:
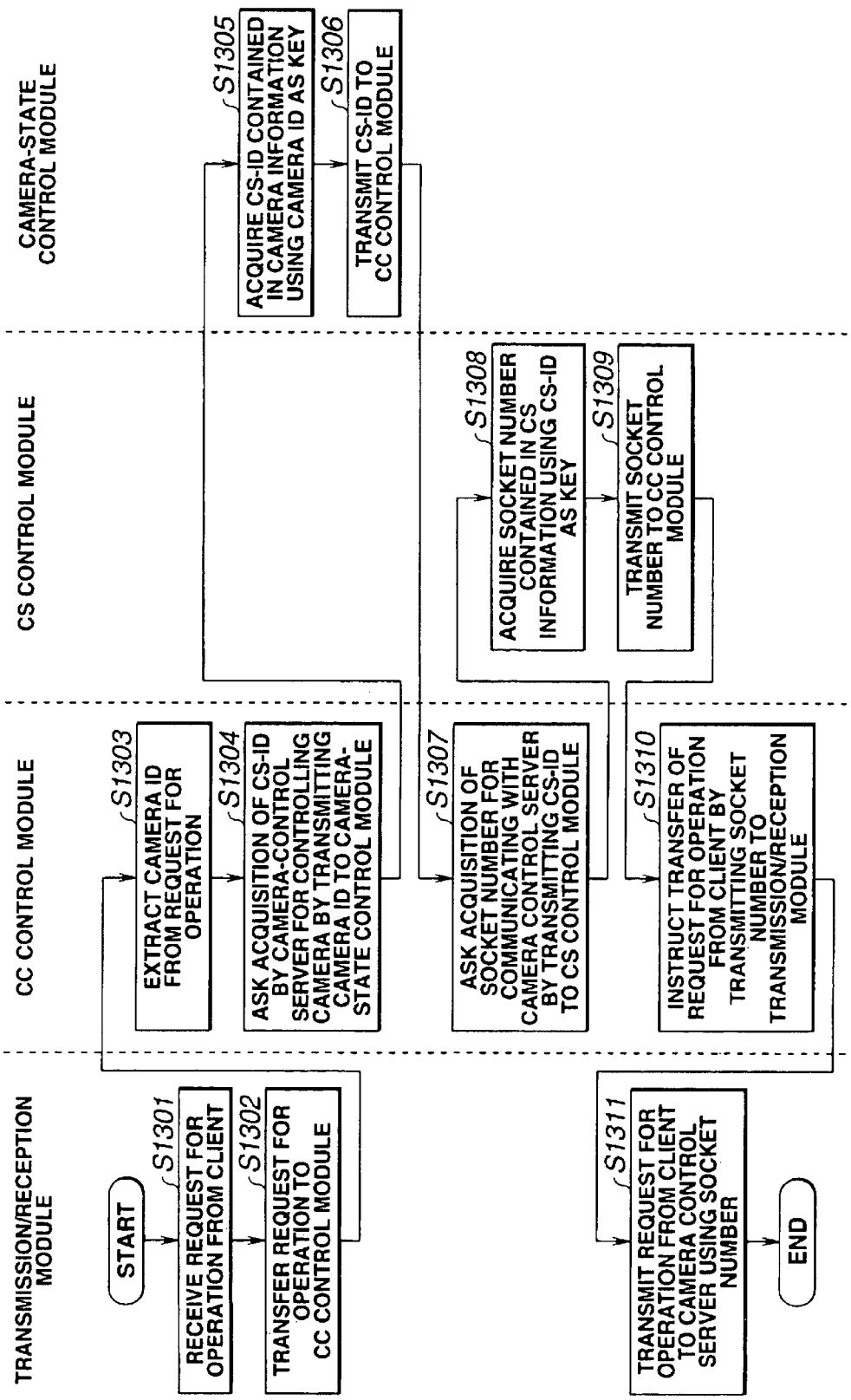
FIG. 17 is a flowchart illustrating processing for operating a camera by a camera client.

Starting of the linkage control server will now be described with reference to FIGS. 10 and 15. FIG. 10 is a schematic diagram illustrating the manner of the operation. FIG. 15 is a flowchart illustrating a control procedure.

When the linkage control server application program 507 has been started, processes, such as "initialization of the CS control module", "initialization of the camera-state control module", and "initialization of the linkage control module", and the like are executed.

The CS control module is initialized in the following manner.

When the camera linkage server application program 507 has been started, the CS control module 517 loads CS control information from the hard disk 510, and forms a table of the CS control information (see FIG. 5). First, the CS control module 517 acquires CS information from the hard disk 510 (step S1101 shown in FIG. 15). Usually, a plurality of CS information are stored. On the hard disk 510, only the "name" of the host computer where the camera control module 410 operates, and the "port number" for communication are stored as the CS information. In order to form CS information other than the "host-computer name" and the "port number", first, the CS control module 517 allocates a CS-ID to the CS information (step S1102). Then, by providing the transmission/reception module 515 with the "host-computer name" and the "port number" for each camera server within the CS information, the CS control module 517 instructs the transmission/reception module 515 to provide connection with the camera control module 410 of each camera server (step S1103).

The transmission/reception module 515 which has received the instruction to form connection forms a socket for communication with the camera control module of each camera server by utilizing the received "host-computer name" and "port number" of each camera server (step S1104). The number of the formed socket (the "socket number") is transmitted to the CS control module 517 as a reply to the instruction to form connection (step S1105). Upon reception of this socket number, the CS control module 517 adds the received socket number to the CS control information (step S1106).

When the processing has proceeded to this stage, the control shifts to the "processing of initializing the camera-state control module".

Initialization of the Camera-State Control Module

For the initialization of the camera state control module, a table as shown in FIG. 7 is formed.

When the control has shifted to the processing of initializing the camera-state control module, first, the camera-state control module 518 acquires all "CS-IDs" and "socket numbers" from the CS control module 517 which has been initialized in the above-described manner (step S1107 shown in FIG. 15). Then, the camera-state control module 518 transmits the acquired "socket numbers" to the transmission/reception module 515, and instructs the transmission/reception-module 518 to transmit a request to acquire camera-state information to all camera control modules (step S1108).

The transmission/reception module 515 transmits a request to acquire camera-state information to each camera control module 410 using the assigned "socket number" (step S1109).

Upon reception of the request to acquire camera-state information from the linkage control server 500, the camera control module 410 transmits the camera-state information (the type of the camera, the orientation and the zooming magnification of the caption camera) which is under the control of that camera control module 410. When a single camera control module 410 controls a plurality of cameras, camera-state information for each camera is transmitted.

Upon reception of the camera-state information transmitted from the camera control module 410 (step S1110), the transmission/reception module 515 of the linkage control server 500 further transfers the received camera-state information to the camera-state control module 518 (step S1111). The camera-state control module 518 allocates the "camera ID" to the received camera-state information (step S1112), and adds the resultant data to the camera-state control table (step S1113). When allocating the "camera ID", the "global camera ID" must be allocated so that the order of magnitude is preserved both in the "camera ID" at the camera control module 410 (the "local camera ID") and the "camera ID" at the camera-state control module 518 (the "global camera ID") is preserved. The value of the first acquired "CS-ID" is set as the value in the "CS-ID" item within the camera-state information (step S1114).

Upon completion of the above-described initialization of the camera-state control module 518, the control returns to the processing of initializing the CS control module 517.

First, the CS control module 517 acquires all of camera-state information from the camera-state control module 518 (step S1115), and sets the value for the "camera ID" item at CS information side based on the values of the "camera ID" item and the "CS-ID" item within the camera-state information (step S1116).

Initialization of the Linkage Control Module

In this processing, linkage control information is loaded from the hard disk, and the contents of the loaded information are copied to the main memory (step S1117). Although the initialization of the CS control module 517 and the initialization of the camera-state control module 518 are processed in a correlated manner, the processing of initializing the linkage control module 519 can be performed independent of these processes.

Starting of the Camera Client

When the user has started the camera client 601 and requested connection with the camera linkage control server 500, the following processing is performed. This processing will be described with reference to FIGS. 11 and 16.

When the user has started the camera client 601 and executed connection processing with the camera-linkage control server application program 507, the connection processing is detected by the transmission/reception module 515 of the linkage control server 500, and a socket for communication is generated (step S1201). Upon detection of this connection, the transmission/reception module 515 notifies the CC control module 517 of the generated "socket number" (step S1202). Upon reception of the notification, the CC control module 517 allocates a CC-ID to the acquired "socket number", and registers the resultant data in the CC-information control table (step S1203). Then, the CC control module 517 instructs the camera-state control module 518 to acquire the "camera ID" and the "caption item" of all camera-state information (step S1204).

Upon reception of the instruction, the camera-state control module 518 extracts all "camera IDs" and "caption items" within the camera-state control table (step S1205), and transmits the extracted data to the CC control module 517 (step S1206).

Upon acquisition of the list of the "camera IDs" and "caption items" (step S1207), the CC control module 517 transfers the acquired list to the transmission/reception module 515, and instructs the transmission/reception module 515 to transmit the list to the camera client 601 (step S1208). Upon acquisition of the list, the transmission/reception module 515 transmits the contents of the list to the camera client 601 (step S1209).

The camera client 601 displays the acquired "camera IDs" and "caption items" on a display unit or the like, and provides information relating to the camera which the user intends to operate, and a user interface for selecting a camera.

Processing performed when the connection with the camera client is terminated is the same as processing performed when starting the connection. That is, upon detection of processing of terminating the connection by the transmission/reception module 515, the number of the terminated socket is transferred to the CC control module 517. The CC control module 517 deletes the transferred "socket number" and the CC-ID corresponding to the "socket number" from the CC control table (see FIG. 6). The delected CC-ID is also transmitted to the camera-state control module 518, and is also deleted from the camera-state information.

Camera Operation by the Camera Client

When the user requests a camera operation utilizing the camera client 601, the following processing is performed. A camera operation cannot be performed unless an operation right for the concerned camera is requested and acquired. In the camera linkage control server 500, processing of acquiring an operation right for the camera and camera operation processing are performed according to the entirely same approach. A camera operation by the camera client 601 will now be described with reference to FIGS. 12 and 17.

An operation performed by the user is converted by the camera client 601 into a message format (camera-operation request) recognizable by the camera linkage control server 500 and is transmitted. Upon reception of the camera-operation request (step S1301), the transmission/reception module 515 transfers the request to the CC control module 517 (step S1302).

The contents of the received camera-operation request are in a format so as to be interpreted and executed by the camera control module 410 substantially without being modified. However, since the "camera ID" assigned in the request is a "global camera ID", the "camera ID" must be converted into a "local camera ID" for the camera control module 410. Accordingly, the CC control module 517 which has received the camera-operation request first extracts the "camera ID" (step S1303). This "camera D" is a "global camera D". The CC control module 517 transmits this "camera ID" to the camera-state control module 518 to acquire the CS-ID of the camera control module 410 controlling the concerned camera (step S1304).

The camera-state control module 518 retrieves camera-state information (see FIG. 7) using the transferred "camera ID" as a key (step S1305). Then, the camera-state control module 518 transmits the value of the CS-ID item within the camera-state information to the CC control module 517 (step S1306).

Upon reception of the "CS-ID", the CC control module 517 transmits the "CS-ID" and the "camera ID" to the CS control module 516, and instructs the CS control module 516 to acquire the "local camera ID", and the "socket number" for communicating with the camera control module 410 (step S1307).

The CS control module 516 first acquires CS information using the "CS-ID" as a key (step S1308), and then extracts the "socket number" from the acquired CS information. The CS control module 516 also compares the value of the "camera ID" item with the transferred camera item, in order to check with which "camera ID" within the "camera ID" item the transferred camera item coincides. If there occurs coincidence, the order of the coincident "camera ID" within the "camera ID" item is used as the "local camera ID". The "socket number" and the "local camera ID" acquired in the above-described manner are transmitted to the CC control module 517 (step S1309).

After replacing the "camera ID" within the operation request by the "local camera ID", the CC control module 517 transmits the "socket number" and the operation request to the transmission/reception module 515, and instructs the transmission/reception module 515 to transmit the request to the camera control module 410 (step S1310). The transmission/reception module 515 transmits the request to the camera control module 410 (step S1311).

Notification of the Camera Operation

When a camera operation has been performed by the camera client 601, notification of the camera operation is transmitted from the "camera-information notification unit" of the camera control module 410. The camera linkage control server 500 updates camera-state information within the camera-state control module 518 or checks conditions for starting linkage control, based on the contents of the notification.

Figure 13:
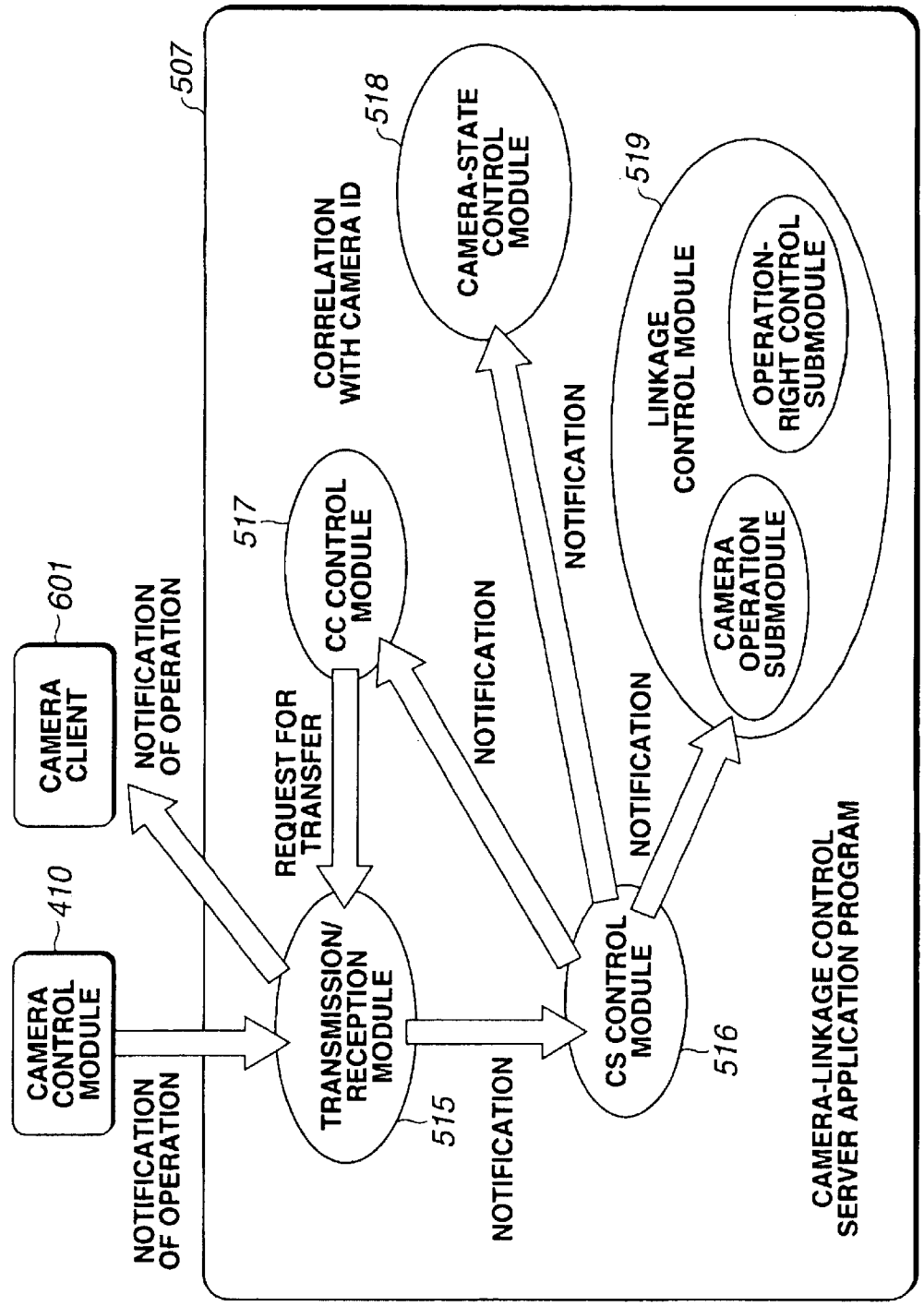
FIG. 13 is a block diagram illustrating processing for notifying a camera operation from a camera control module.
Figure 18:
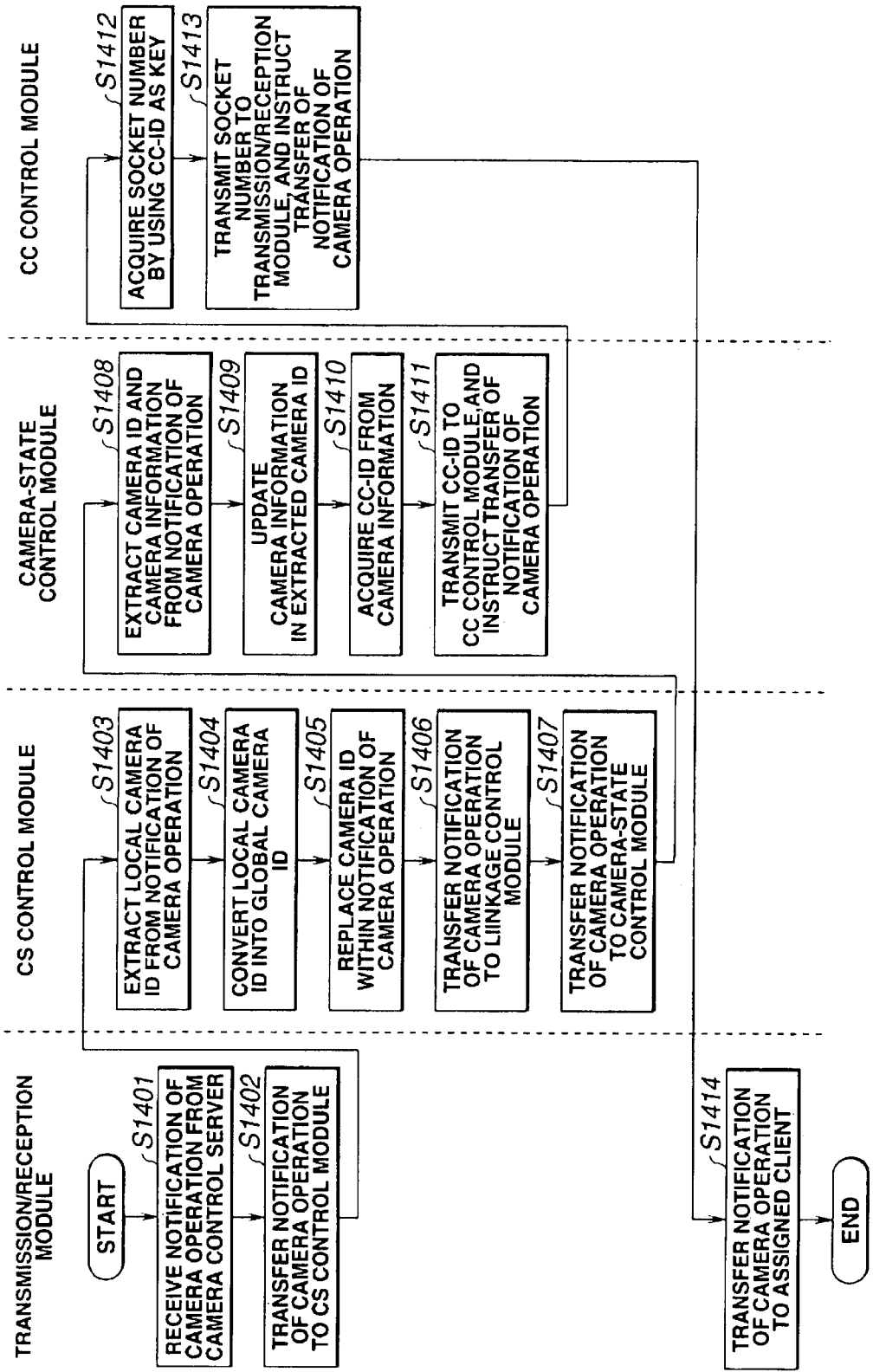
FIG. 18 is a flowchart illustrating processing for notifying a camera operation from a camera control module.

This processing will be described with reference to FIGS. 13 and 18.

When the notification of the camera operation has been transmitted from the camera control module 410 and has been received by the transmission/reception module 515 within the camera linkage control server 500 (step S1401), the transmission/reception module 515 transfers the notification of the camera operation to the CS control module 516 (step S1402).

The CS control module 516 first extracts the "local camera ID" included in the notification of the camera operation (step S1403), and then converts the extracted "local camera ID" into a "global camera ID" (step S1404). This conversion may be performed by referring to the "camera ID" item within the CS information (see FIG. 5) corresponding to the camera control module 410 which has transmitted the notification of the camera operation, and extracting the "camera ID" at the order corresponding to the "local camera ID". Thus, the "local camera ID" written in the notification of the camera operation is replaced by the "global camera ID" (step S1405). Then, the rewritten notification of the camera operation is transferred to the linkage control module 519 and the camera-state control module 518 (steps S1406 and S1407). In the flowchart shown in FIG. 18, steps 1406 and 1407 are sequentially performed in this order. Actually, however, steps S1406 and S1407 are simultaneously executed.

In step S1406, the notification of the camera operation is processed by the linkage control module 519. This processing will be described later. The processing at the camera-state control module 518 executed in step S1407 will now be described.

The camera-state control module 518 to which the notification of the camera operation has been transferred from the CS control module 516 extracts camera-state information, such as the "camera ID", the "orientation" and the "zooming magnification" of the camera, and the like (step S1408). Then, the camera-state control module 518 updates camera-state information within the camera-state control table (see FIG. 7) based on the extracted information (step S1409). The camera-state control module 518 further extracts the value of the CC-HD item from the camera-state information (step S1410), transmits the CC-ID to the CC control module 517, and instructs the CC control module 517 to transfer the notification of the camera operation (step S1411).

The CC control module 517 to which the transfer has been instructed performs processing for transferring the notification of the camera operation to all camera clients 601 which intend to refer to the operated camera. By transferring the notification of the camera operation to each camera client 601, the camera client 601 can perform processing, such as reflecting the camera operation on a display on a display unit, and the like. The CC control module 517 retrieves the "socket number" necessary for communicating with the camera client 601 using the CC-ID transmitted from the camera-state control module 518 as a key (step S1412). When this "socket number" has been obtained, the CC control module 517 transfers the notification of the camera operation where the "socket number" and the "camera ID" have been rewritten to the transmission/reception module 515, and instructs the transmission/reception module 515 to transmit the notification of the camera operation to the camera client 601 (step S1413). Finally, the transmission/reception module 515 transmits the notification of the camera operation to the assigned camera client 601 (step S1414).

Control of Camera Linkage

Figure 14:
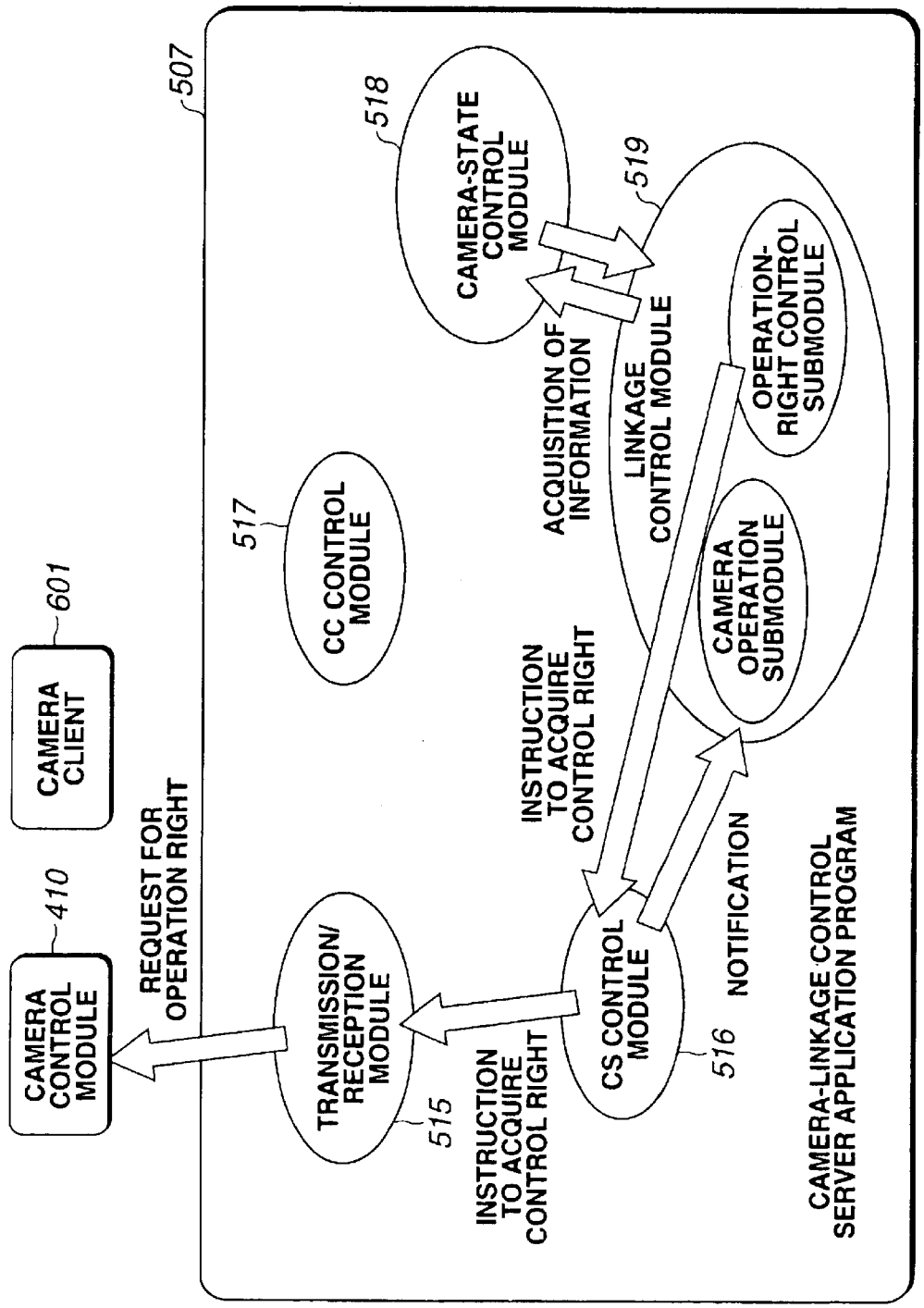
FIG. 14 is a block diagram illustrating camera linkage processing.
Figure 19:
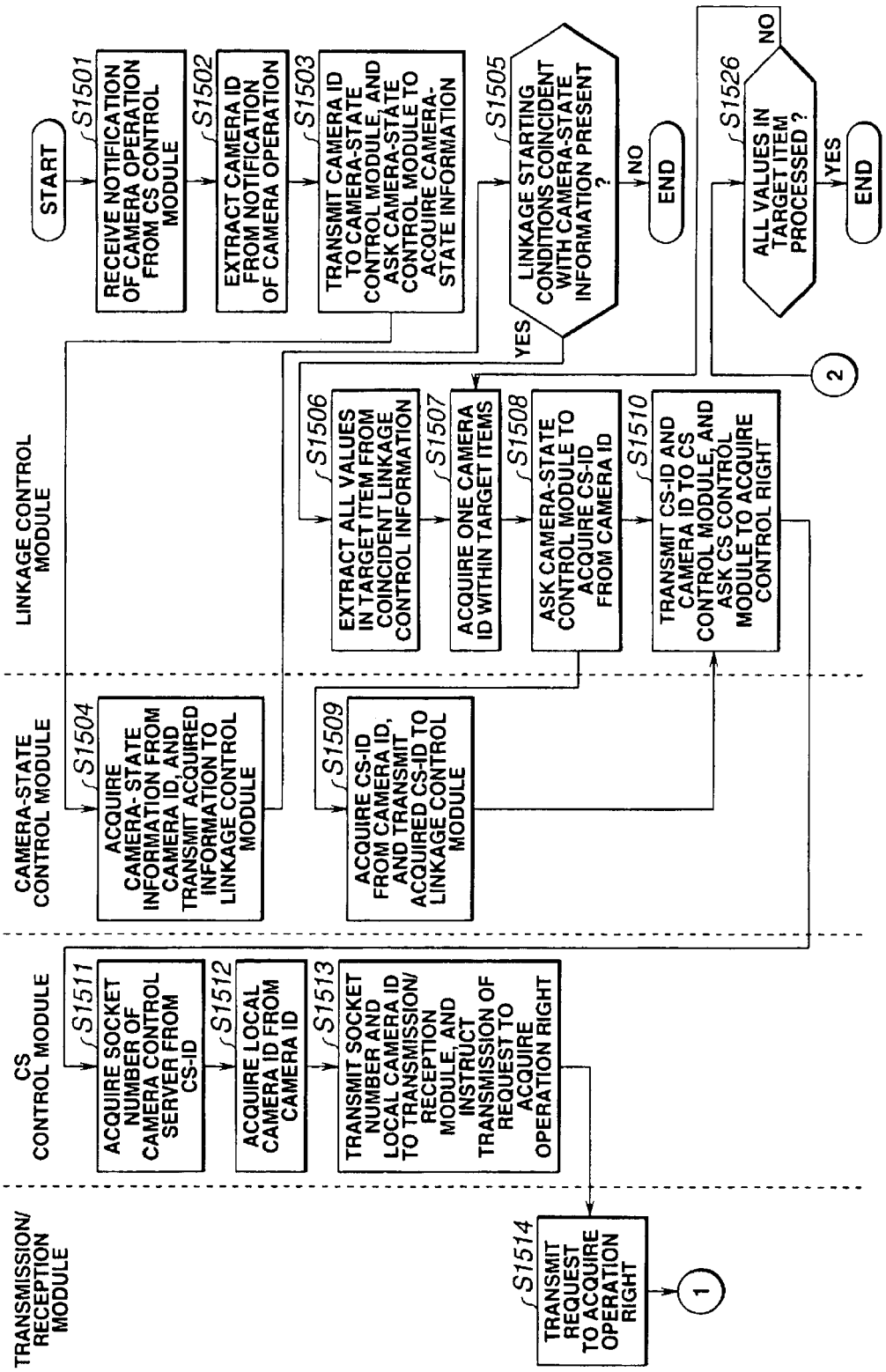
FIGS. 19 and 20 are flowcharts illustrating camera linkage processing.
Figure 20:
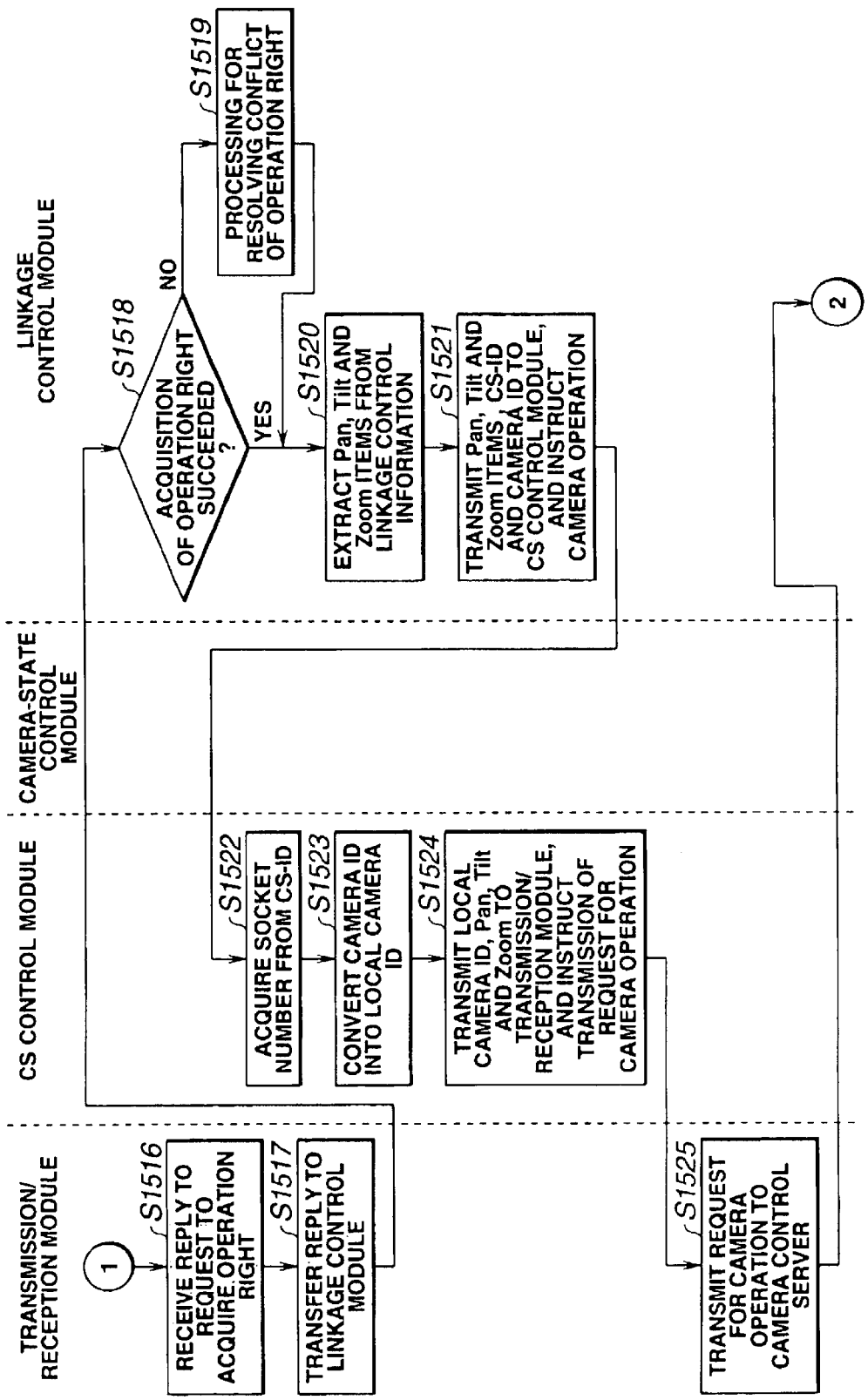

The manner of camera linkage control will now be described with reference to FIGS. 14, 19 and 20. Processing shown in FIG. 19 is mainly executed by the operation-right control submodule 521, and processing shown in FIG. 20 is executed by the camera operation submodule 520.

Upon reception of the notification of the camera operation from the CS control module 516 (step S1501), the linkage control module 519 extracts the "camera ID" from the received notification of the camera operation (step S1502). It is possible to obtain camera-state information by directly referring to the contents of the received notification of the camera operation. In the first embodiment, however, camera-state information is acquired via the camera-state control module 518. It is thereby possible to limit the module which deals with the notification of the camera operation, and to easily change the system. That is, by providing the camera-state control module 518 with the extracted "camera ID", the linkage control module 519 asks the camera-state control module 518 to acquire camera-state information (step S1503). In response to this request, the camera-state control module 518 retrieves camera-state information based on the "camera ID", and transmits the retrieved camera-state information to the linkage control module 519 (step S1504). The camera linkage control module 519 which has obtained the camera-state information compares this camera-state information with the value of the "Camera-Id" item and the "Pan", "Tilt" and "Zoom" items in the linkage control information (see FIG. 8) which has been loaded from the hard disk 510 into the main memory when starting the camera-linkage control server 507, in order to check if there is a coincidence between the two types of information. When linkage control information coincident with the the camera-state information is not found as a result of the check, the processing is terminated.

When linkage control information coincident with the camera-state information has been found (step S1505), all values in the "camera to be linked" (Target) item contained in that linkage control information are extracted (step S1506), and the processing starting from step S1507 is performed for each of the values.

In the first embodiment, it is assumed that a plurality of linkage control information having the same "starting conditions" cannot be assigned. However, a control procedure in which a plurality of linkage control information having the same starting conditions are allowed is also easy to operate. In this case, processing starting from step S1505 may be repeated until linkage control information having the same starting conditions is absent.

That is, first, one "camera ID" having a value in the Target item is acquired (step S1507), the acquired "camera ID" is transmitted to the camera-state control module 518, and acquisition of the "CS-ID" is instructed (step S1508). The camera-state control module 518 retrieves camera-state information using the "camera ID" as a key, extracts a corresponding value in the "CS-ID" item from the camera-state information, and transmits the extracted value to the linkage control module 519 (step S1509). The linkage control module 519 transmits the "CS-ID" and the "camera ID" to the CS control module 516, and asks the CS control module 516 to acquire an operation right for the camera (step S1510).

Upon reception of this request, the CS control module 516 retrieves a "socket number" for communicating with the camera control module 410 from the received "CS-ID" (step S1511), and converts the "camera ID" into a "local camera ID" (step S1512). Then, the CS control module 516 transmits the "socket number" and the "local camera ID" to the transmission/reception module 515, and instructs the transmission/reception module 515 to transmit a request for acquiring an operation right (step S1513).

In response to this instruction, the transmission/reception module 515 transmits a request to acquire an operation right to the camera control module 410 (step S1514). A result for the request transmitted from the camera control module 410 to the transmission/reception module 515 of the linkage control server 500 is received (step S1516). The result is further transferred to the linkage control module 519 (step S1517). When an operation right could be obtained (step S1518), the linkage control module 519 instantaneously executes processing starting from step S1520.

When acquisition of an operation right has failed (step S1518), i.e., when the concerned camera is already in use by another camera client 601, processing to resolve the conflict of the operation right assigned in the Policy item within the linkage control information is executed (step S1519). As described above, the items which can be assigned as Policy are:

wait until the operation right is released forcedly acquire an operation right for the camera p, acquire an operation right for an alternative camera (for example, a camera q), and give up an operation for the camera p.

As described above, these items are set by means of the window dialog shown in FIG. 9.

When "wait until the operation right is released" is assigned, the "processing for resolving conflict of the operation right" in step S1519 is temporarily interrupted, and the processing becomes in a suspended state in step S1519 until a new notification of a camera operation is transmitted from the camera control module 410.

End of the operation by another client for the concerned camera is detected by the camera control module 410. Accordingly, when a notification of a camera operation indicating that the operation right for the camera has been abandoned from the camera control module 410 has been received by the linkage control module 519 via the transmission/reception module 515, the suspended processing is resumed.

On the other hand, when "forcedly acquire an operation right for the camera" has been selected as the processing for resolving conflict of the operation right, transmission of a request to acquire an operation right is again instructed to the transmission/reception module 515. However, at this request to acquire an operation right, a "forced-acquisition flag" is put in an on-state. When the camera control module 410 does not support a forced-acquisition function, this resolving method is, of course, ineffective. When the forced-acquisition flag is supported and forced acquisition of an operation right has succeeded, the processing starting from step S1520 is resumed.

When "give up an operation for that camera" has been selected as the processing for resolving conflict of the operation right, the processing starting from step S1520 is interrupted, and the processing starting from step S1507 is resumed.

When "acquire an operation right for an alternative camera" has been selected as the processing for resolving conflict of the operation right", a value in the Alternative item of the linkage control information is extracted, and the processing starting from step S1508 is resumed for the assigned "camera ID".

When an operation right has been acquired in any way as a result of the processing for resolving conflict of the operation right (step S1518), values for the "nPan", "nTilt" and "nZoom" items are extracted from the linkage information (step S1520), the previously acquired "camera ID" and "CS-ID" is transmitted to the CS control module 516, and transmission of a request for a camera operation is instructed (step S1521). The CS control module 516 acquires the "socket number" from the "CS-ID" as in the above-described case (step S1522), and converts the "camera ID" into a "local camera ID" (step S1523). The obtained values of the "local camera ID", the "socket number", and the "nPan", "nTilt" and "nZoom" are transmitted to the transmission/reception module 515, and transmission of a request for a camera operation is instructed (step S1524). Finally, the transmission reception module 515 transmits a request for a camera operation to the camera control module 410 (step S1525).

The above-described processing is repeated for all values in the Target item (cameras to be linked) (step S1526).

Camera linkage is controlled in the above-described manner.

By including a plurality of Target values in the linkage control information, a plurality of cameras can be linked.

As described above, in the first embodiment, the following units are provided:

an operation unit for each camera, an operation-right control unit for each camera, an operation-right control submodule within a linkage control module for controlling an operation right for each of a plurality of cameras, a camera operation submodule within a linkage control module for controlling and executing conditions for generating camera linkage and the specific contents of linkage, a camera-state control module for controlling the orientation, the zooming magnification and the like of each camera for detecting conditions for generating camera linkage, and a transmission/reception module, a CS control module, a CC control module for allowing acquisition of camera-state information controllled by the camera-state-information control module.

According to the above-described configuration, in the first embodiment, it is possible to perform camera linkage control which can coexist with an operation of each camera according to a conventional camera control module. The camera client can operate each camera using a conventional camera control module, and at the same time, can link a plurality of cameras.

Second Embodiment

Figure 21:
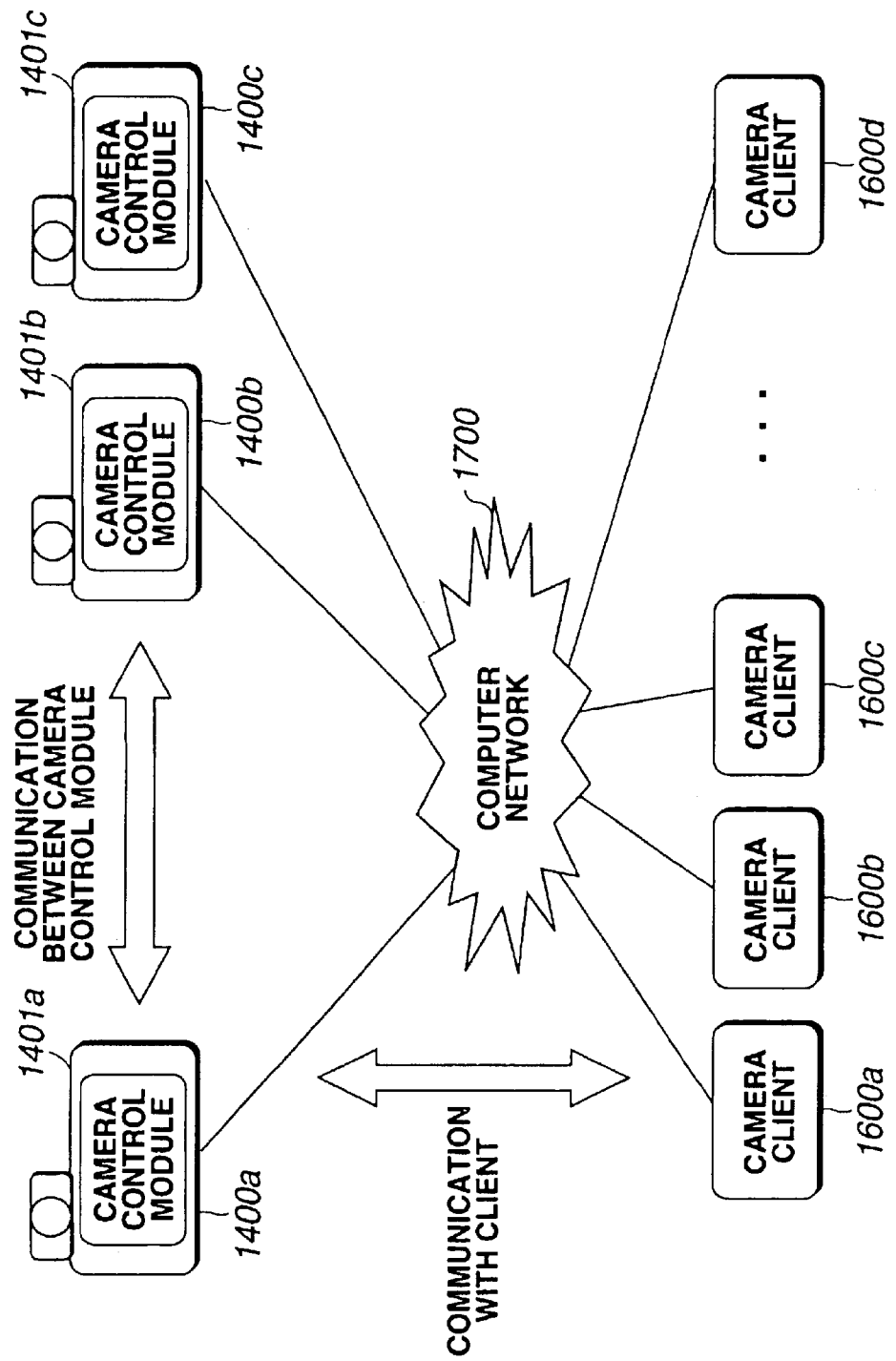
FIG. 21 is a block diagram illustrating the concept of a second embodiment of the present invention.

A second embodiment of the present invention will now be described. FIG. 21 is a block diagram illustrating the concept of the second embodiment.

In the first embodiment, each unit for camera linkage is realized as independent software in the form of a multi-camera control server. In the second embodiment, however, each unit for camera linkage is incorporated in a camera control module. In addition, the camera control module itself is not operated by a PC which is independent of a camera, but operates in a CPU or a main memory incorporated in the camera.

Accordingly, as shown in FIG. 21, in the second embodiment, camera control modules 1401a, 1401b and 1401c are incorporated within cameras 1400a, 1400b and 1400c, respectively. It is assumed, however, that the camera control modules 1401a, 1401b and 1401c have the same function as the camera control module in the first embodiment. Each of the camera control modules 1401a, 1401b and 1401c performs communication with camera clients 1600a, 1600b, 1600c and 1600d using a computer network 1700 without using a multicamera control server as in the first embodiment. A linked operation of a plurality of cameras is realized by performing communication between a pair of camera control modules.

Components in the second embodiment will now be described with reference to FIG. 22.

In FIG. 22, a camera 1411 and a camera client 1600 are present, and are connected via a computer network 1712. Also not illustrated in FIG. 22, the camera 1411 has a main memory and can execute a program. A database control system 1410 is connected to the camera 1411. The data of a program operating within the camera 1411 can be controlled utilizing the database control system 1410.

A camera control module 1401 is provided in the main memory within the camera 1411. The camera control module 1401 is divided into two modules, i.e., a core control module 1402 and a remote control module 1408. The core control module 1402 corresponds to the camera control module in the first embodiment, and includes a local camera operation submodule 1403 for operating the camera 1411, and a local operation-right control submodule 1404 for controlling the operation right for the camera 1411. The remote control module 1408 corresponds to the multicamera control server 500 in the first embodiment, and includes a remote operation-right control submodule 1405 for controlling operation rights for a plurality of cameras, a remote linkage control submodule 1407 for controlling camera linkage, and a remote camera-state control submodule 1406 for controlling information relating to cameras under the control of other camera control modules in addition to the camera 1411.

In the second embodiment, there are provided the remote camera-state control module 1406, the remote linkage control submodule 1407 and the remote operation-right control sub-module 1405 as components corresponding to the camera-state control module 518, the camera operation submodule 520 and the operation-right control submodule 521 in the first embodiment, respectively. However, components corresponding to the transmission module 515, the CS control module 516 and the CC control module 517 in the first embodiment are not clearly shown in FIG. 22. However, the function corresponding to the CC control module 517 is provided by the local operation-right control submodule 1404. The function corresponding to the CS control module 516 is incorporated in the remote camera-state control submodule 1406. In the second embodiment, since the camera and the camera contol module are always in 1:1 correspondence, it is unnecessary to deal with camera information and CS information separately.

In the second embodiment, an interprocess communication function, such as a socket or the like, is not used, and it is assumed that the database control system 1410 provides a "change notification function". The "change notification function" is a function of notifying, when there is a change in data controlled in the database, each client referring to that data of the change. The function corresponding to the transmission/reception module is provided by the change notification function. However, when the database control system 1410 does not provide the "change notification function", it is necessary to add a transmission/reception module similar to that in the first embodiment to the camera control module 1401.

In the second embodiment, camera information and CC information used by each module are the same as those shown in the first embodiment. It is assumed, however, that each item of the CS information is included within the camera information. The above-described set of information is controlled in the database control system 1410. Accordingly, each module need not form a table. Information in the database can be referred to from all camera control modules.

In the second embodiment, the operation of each module is the same as in the first embodiment. That is, each module name in the first embodiment may be replaced with each sub-module name in the second embodiment, and control of referring to CS information in the first embodiment may be changed to control of referring to camera information.

However, since the second embodiment does not have the transmission/reception module as in the first embodiment, a portion of control in the first embodiment of performing communication using the transmission/reception module is changed in the following manner.

That is, in order to realize processing of transmitting a request message, such as a request for a camera operation or the like, to another camera control module, an item "request" is added to camera information relating to a camera control module which is requested to perform processing. An identifier (such as a character string representing the name of a request, or the like) for indicating the type of the request (a request to acquire an operation right, or the like) is used as the value for the request item.

Since a change is notified from the database control module 1410 to the camera control module having the camera information where the item is added, the value of the request item added to the camera information is checked. If it is known that a "request for camera control" is added, processing for that request can be executed in the same manner as in the first embodiment in which the request for camera control is received from the transmission/reception module.

As for a reply for the above-described request, a "reply" item may be added to the camera information of the camera control module to which a reply is to be notified, and a value may be set as the contents of the reply. The "request" and "reply" items may be appropriately deleted when these items become unnecessary.

Communication between the camera client and the camera control module is realized in the same manner. That is, the "request" and "reply" items may be added to CC information, and appropriate values may be set for these items.

As described above, second embodiment provides a camera control module including:
  a local camera operation submodule, serving as an operation unit for each camera,
  a local operation-right control submodule, serving as an operation-right control unit for each camera,
  a remote operation-right control submodule for controlling an operation right for each of a plurality of cameras,
  a remote linkage control submodule for controlling and executing conditions for generating camera linkage and the specific contents of linkage,
  a camera-state control module for controlling the orientation, the zooming magnification and the like of each camera for detecting conditions for generating camera linkage, and
  a database control system for allowing sharing of camera information controllled by the camera-information control module.

As described above, in the second embodiment, a data control mechanism is realized using a database control system, and components for camera linkage are incorporated in each camera control module. Hence, even if the number of cameras is increased or decreased, it is possible to continue to operate the system only by operating camera information in the database. In addition, the load of camera linkage processing is not concentrated in a specific computer, but is dispersed in each camera control module, and hence, the efficiency in utilization of the entire system is improved over the first embodiment.

The objects of the present invention may, of course, also be achieved by supplying a system or an apparatus with a storage medium storing program codes of software for realizing the functions of the above-described embodiments, and reading and executing the program codes stored in the storage medium by means of a computer, a CPU or an MPU (microprocessor unit) of the system or the apparatus.

In such a case, the program codes themselves read from the storage medium realize the functions of the above-described embodiments, so that the storage medium storing the program codes constitutes one aspect of the present invention.

For example, a floppy disk, a hard disk, an optical disk, a magnetooptical disk, a CD(compact disc)-ROM(read-only memory), a CD-R(recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, according to the above-described embodiments, it is possible to cause a plurality of cameras or image pickup means to perform a linked operation from a remote location.

More specifically, cameras which do not relate to linkage can continue to be operated as individual cameras.

When a plurality of linkage processes are requested to the same camera, an appropriate alternative process can be provided.

It is also possible to cause two cameras to operate while complementing problems in respective cameras, or to perform the same operation or operations inverse to each other.

The individual components shown in outline or designated by blocks in the drawings are all well known in the camera control system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera control system for controlling a linked operation of a plurality of cameras via a network, said system comprising:
    camera setting means for setting a plurality of cameras connected to the network as cameras to be linked with one another;
    movement setting means for setting conditions and contents of a linked movement for each of the cameras set by said camera setting means;
    camera-state-information acquisition means for acquiring information relating to a state of at least one photographing parameter of the plurality of cameras set by said camera setting means;
    starting means for starting, when a camera satisfying the conditions of the linked movement set by said movement setting means is present based on the state information acquired by said camera-state-information acquisition means, the contents of the linked movement corresponding to the conditions of the linked movement set by said movement setting means; and
    output means for outputting a control command corresponding to the contents of the linked movement to at least one camera to be linked with the camera satisfying the set conditions.

2. A system according to claim 1, wherein said camera setting means comprises identifier storage means for storing an identifier for a camera assigned by an arbitrary client apparatus to perform a linked movement.

3. A system according to claim 1, further comprising:
    operation-right request means for requesting, when a request for an operation right for a camera from an arbitrary client apparatus has been received, the operation right for the camera, and an operation right for at least one camera which performs a linked movement with the camera.

4. A system according to claim 3, further comprising:
    information storage means for storing, when it has been impossible to acquire an operation right for any one of the cameras to be linked for which operation rights have been requested by said operation-right request means, information defining a control to be performed in such a case,
    wherein said output means outputs a control command to a camera which performs a linked movement based on the information stored in said information storage means.

5. A system according to claim 4, wherein the control information to be performed stored in said information storage means is a control of forcedly acquiring an operation right for the camera which is already being used.

6. A system according to claim 4, wherein the control information to be performed stored in said information storage means is a control of replacing a camera which is already being used with an alternative camera.

7. A system according to claim 4, wherein the control information to be performed stored in said information storage means is a control of waiting for a predetermined time period until an operation right for a camera which is already being used is acquired.

8. A system according to claim 4, wherein the control information to be performed stored in said information storage means comprises:
    (a) a control of forcedly acquiring an operation right for a camera which is already being used;
    (b) a control of replacing the camera which is already being used with an alternative camera; and
    (c) a control of waiting for a predetermined time period until an operation right for the camera which is already being used is acquired.

9. A system according to claim 1, wherein the at least one photographing parameter comprises one of camera tilt, pan and zoom.

10. A camera control method for controlling a linked operation of a plurality of cameras via a network, said method comprising:
    a camera setting step of setting a plurality of cameras connected to the network as cameras to be linked with one another;
    a movement setting step of setting conditions and contents of a linked movement for each of the cameras set in said camera setting step;
    a camera-state-information acquiring step of acquiring information relating to a state of at least one photographing, parameter of the plurality of cameras set in said camera setting step,
    a starting step of starting, when a camera satisfying the conditions of the linked movement set in said movement setting step is present based on the state information acquired in said camera-state-information acquiring step, the contents of the linked movement corresponding to the conditions of the linked movement set in said movement setting step; and
    an output step of outputting a control command corresponding to the contents of the linked movement to at least one camera to be linked with the camera satisfying the set conditions.

11. A method according to claim 10, wherein said camera setting step comprises an identifier storing step of storing an identifier for a camera assigned by an arbitrary client apparatus to perform a linked movement.

12. A method according to claim 10, further comprising:
    an operation-right requesting step of requesting, when a request for an operation right for a camera from an arbitrary client apparatus has been received, the operation right for the camera, and an operation right for at least one camera which performs a linked movement with the camera.

13. A method according to claim 12, further comprising:
    an information storing step of storing, when it has been impossible to acquire an operation right for any one of the cameras to be linked for which operation rights have been requested in said operation-right requesting step, information defining a control to be performed in such a case,
    wherein said output step outputs a control command to a camera which performs a linked movement based on the information stored in said information storing step.

14. A method according to claim 13, wherein the control information to be performed stored in said information storing step is a control of forcedly acquiring an operation right for a camera which is already being used.

15. A method according to claim 13, wherein the control information to be performed stored in said information storing step is a control of replacing the camera which is already being used with an alternative camera.

16. A method according to claim 13, wherein the control information to be performed stored in said information storing step is an operation of waiting for a predetermined time period until an operation right for the camera which is already being used is acquired.

17. A method according to claim 13, wherein the control information to be performed stored in said information storing step includes:

(a) a control of forcedly acquiring an operation right for a camera which is already being used;

(b) a control of replacing the camera which is already being used with an alternative camera; and (c) a control of waiting for a predetermined time period until an operation right for the camera which is already being used is acquired.

18. A method according to claim 10, wherein the at least one photographing parameter comprises one of camera tilt, pan and zoom.

19. A storage medium storing an operation processing program for controlling a linked operation of a plurality of cameras via a network, said program comprising the processes of:

setting a plurality of cameras connected to the network as cameras to be linked with one another;

setting conditions and contents of a linked movement for each of the set cameras;

acquiring information relating to a state of at least one photographing parameter of the plurality of set cameras, starting, when a camera satisfying the set conditions of the linked movement is present based on the acquired state information, the contents of the linked movement corresponding to the set conditions of the linked movement; and outputting a control command corresponding to the contents of the linked operation to at least one camera to be linked with the camera satisfying the set conditions.

20. A storage medium according to claim 19, wherein the at least one photographing parameter comprises one of camera tilt, pan and zoom.

* * * * *

UNITED STATES PATENT AND TRADEMARK OFFICE
CERTIFICATE OF CORRECTION

PATENT NO. : 6,909,457 B1
APPLICATION NO. : 09/401983
DATED : June 21, 2005
INVENTOR(S) : Fukasawa It is certified that error appears in the above-identified patent and that said Letters Patent is hereby corrected as shown below:

COLUMN 1
Line 32, "been" should read --be--;
Line 34, "components." should read --components:--;
Line 35, "images" should read --images.--; and
Line 67, "can be" should read --can--.

COLUMN 2
Line 32, "staring" should read --starting--.

COLUMN 3
Line 38, "staring" should read --starting--.

COLUMN 4
Line 15, "connected;" should read --connected--.

COLUMN 6
Line 16, "transmission-reception" should read --transmission/reception--.

COLUMN 9
Line 39, "durint" should read --during--; and
Line 62, "Pan the" should read --Pan=the--.

COLUMN 11
Line 39, "camera state" should read --camera-state--; and
Line 49, "reception-module" should read --reception module--.

COLUMN 13
Line 9, "delected" should read --detected--;
Line 37, "camera D" should read --"camera ID"--; and
Line 38, "camera D"" should read --camera ID"--.

COLUMN 14
Line 57, "CC-HD" should read --CC-ID--.

COLUMN 16
Line 34, "realeased" should read --released,--.

COLUMN 17
Line 26, "transmission reception" should read --transmission/reception--.

UNITED STATES PATENT AND TRADEMARK OFFICE
CERTIFICATE OF CORRECTION

PATENT NO. : 6,909,457 B1
APPLICATION NO. : 09/401983
DATED : June 21, 2005
INVENTOR(S) : Fukasawa It is certified that error appears in the above-identified patent and that said Letters Patent is hereby corrected as shown below:

COLUMN 18
Line 62, "contol" should read --control--.

COLUMN 22
Line 33, "photographing," should read --photographing--; and
Line 34, "step," should read --step;--.

Signed and Sealed this

Twenty-first Day of November, 2006

JON W. DUDAS
*Director of the United States Patent and Trademark Office*